US012609243B2

(12) United States Patent
Araki

(10) Patent No.: US 12,609,243 B2
(45) Date of Patent: Apr. 21, 2026

(54) MULTILAYER CERAMIC CAPACITOR

(71) Applicant: Murata Manufacturing Co., Ltd., Nagaokakyo (JP)

(72) Inventor: Yuuichi Araki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 143 days.

(21) Appl. No.: 18/746,115

(22) Filed: Jun. 18, 2024

(65) Prior Publication Data

US 2025/0299881 A1      Sep. 25, 2025

(30) Foreign Application Priority Data

Mar. 19, 2024      (JP) ................................. 2024-043985

(51) Int. Cl.
| | |
|---|---|
| *H01G 4/012* | (2006.01) |
| *H01G 4/008* | (2006.01) |
| *H01G 4/12* | (2006.01) |
| *H01G 4/232* | (2006.01) |
| *H01G 4/30* | (2006.01) |

(52) U.S. Cl.
CPC ........... *H01G 4/012* (2013.01); *H01G 4/0085* (2013.01); *H01G 4/1227* (2013.01); *H01G 4/1236* (2013.01); *H01G 4/232* (2013.01); *H01G 4/30* (2013.01)

(58) Field of Classification Search
CPC .... H01G 4/012; H01G 4/0085; H01G 4/1227; H01G 4/1236; H01G 4/232; H01G 4/30
See application file for complete search history.

(56) References Cited

U.S. PATENT DOCUMENTS

| | | | |
|---|---|---|---|
| 2015/0036262 A1* | 2/2015 | Kai | H01G 4/1209 |
| | | | 361/301.4 |
| 2017/0186547 A1* | 6/2017 | Sato | H01G 4/30 |
| 2018/0102217 A1 | 4/2018 | Fukunaga | |
| 2020/0043657 A1* | 2/2020 | Ariizumi | H01G 4/1218 |
| 2021/0202169 A1* | 7/2021 | Iguchi | C04B 35/49 |
| 2021/0202180 A1 | 7/2021 | Fukunaga et al. | |

FOREIGN PATENT DOCUMENTS

| | | |
|---|---|---|
| JP | 2001-237137 A | 8/2001 |
| KR | 20180040078 A | 4/2018 |
| KR | 20210084286 A | 7/2021 |

\* cited by examiner

*Primary Examiner* — Michael P McFadden
(74) *Attorney, Agent, or Firm* — Keating & Bennett, LLP

(57)      ABSTRACT

A multilayer ceramic capacitor includes a multilayer body including an effective layer-width direction-end portion, an effective layer-middle portion, and a rare earth segregation region in which a rare earth element is segregated. A relationship between a segregation amount of a rare earth element in the rare earth segregation region in the effective layer-width direction-end portion and a segregation amount of a rare earth element in the rare earth segregation region in the effective layer-middle portion is expressed as: the effective layer-middle portion>the effective layer-width direction-end portion.

16 Claims, 14 Drawing Sheets

FIG. 10

| | $P_C$ (RARE EARTH SEGREGATION IN MIDDLE PORTION) | $P_W$ (RARE EARTH SEGREGATION IN END PORTION IN WIDTH DIRECTION) | $P_C/P_W$ | AI SEGREGATION IN END PORTION IN WIDTH DIRECTION | HIGH TEMPERATURE LOAD RELIABILITY | TEMPERATURE CHARACTERISTICS |
|---|---|---|---|---|---|---|
| COMPARATIVE EXAMPLE 1 | 0 | 0 | 0 | ABSENT | × | ○ |
| COMPARATIVE EXAMPLE 2 | 1 | 1.04 | 1.0 | ABSENT | × | ○ |
| EXAMPLE 1 | 1 | 0.47 | 2.1 | ABSENT | ○ | ○ |
| EXAMPLE 2 | 1 | 0.32 | 3.1 | ABSENT | ○ | ○ |
| EXAMPLE 3 | 1 | 0.25 | 4.0 | ABSENT | ○ | ○ |
| EXAMPLE 4 | 1 | 0.18 | 5.6 | ABSENT | ○ | △ |
| EXAMPLE 5 | 1 | 0.12 | 8.3 | ABSENT | ○ | △ |
| EXAMPLE 6 | 1 | 0.44 | 2.3 | PRESENT | ◎ | ○ |
| EXAMPLE 7 | 1 | 0.38 | 2.6 | PRESENT | ◎ | ○ |
| EXAMPLE 8 | 1 | 0.27 | 3.7 | PRESENT | ◎ | ○ |

MULTILAYER CERAMIC CAPACITOR

CROSS REFERENCE TO RELATED APPLICATIONS

This application claims the benefit of priority to Japanese Patent Application No. 2024-043985 filed on Mar. 19, 2024. The entire contents of this application are hereby incorporated herein by reference.

BACKGROUND OF THE INVENTION

1. Field of the Invention

The present invention relates to multilayer ceramic capacitors.

2. Description of the Related Art

For example, the multilayer ceramic capacitor described in Japanese Unexamined Patent Application Publication No. 2001-237137 includes a capacitor body of a ceramic sintered body made of a dielectric material such as barium titanate. Such a capacitor body includes internal electrode layers each made of a noble metal material such as silver or a silver-palladium alloy, or a base metal material such as nickel with a ceramic layer functioning as a dielectric layer interposed therebetween. The internal electrode layers alternately extend toward one end surface and the other end surface of the capacitor body. The internal electrode layers extending toward the one end surface and the internal electrode layers extending toward the other end surface are electrically connected to respective one of external electrodes having different potentials.

The internal electrode layers of the multilayer capacitor described in Japanese Unexamined Patent Application Publication No. 2001-237137 are each made of a metal material, and the external electrodes are each made of a plurality of metal components including the same metal as that of the internal electrode layers or a metal capable of being alloyed with the metal of the internal electrode layers, and a glass component. The external electrodes are each bonded to a wiring board via an electrically conductive resin adhesive. The area occupation ratio of the metal component to the cross-sectional area of each of the external electrodes ranges from 60% to 95%. Thus, the multilayer capacitor described in Japanese Unexamined Patent Application Publication No. 2001-237137 can be mounted on the wiring board at low cost with high reliability without using solder.

SUMMARY OF THE INVENTION

Such conventional multilayer ceramic capacitors described above may have lower high-temperature reliability. In particular, a decrease in high-temperature reliability may occur at end portions in the width direction of the internal electrode layers.

Example embodiments of the present invention provide multilayer ceramic capacitors that are each able to reduce or prevent a decrease in high temperature reliability.

A multilayer ceramic capacitor according to an example embodiment of the present invention includes a multilayer body including a plurality of laminated dielectric layers and a plurality of laminated internal electrode layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, an effective layer portion including the plurality of dielectric layers and the plurality of internal electrode layers that are alternately laminated, and outer layer portions that sandwich the effective layer portion in the height direction, a first external electrode on the first end surface, and a second external electrode on the second end surface, in which the multilayer body includes an effective layer-width direction-end portion provided at an end portion of the effective layer portion in the width direction and an effective layer-middle portion provided at a middle portion of the effective layer portion, the multilayer body further includes a rare earth segregation region in which a rare earth element is segregated, in a cross section parallel or substantially parallel to the width direction and the height direction, a relationship between a segregation amount of a rare earth element in the rare earth segregation region in the effective layer-width direction-end portion and a segregation amount of a rare earth element in the rare earth segregation region in the effective layer-middle portion is expressed as: the effective layer-middle portion>the effective layer-width direction-end portion, and a dielectric material of the plurality of dielectric layers includes at least one of calcium, zirconium, or strontium, and includes a perovskite-type structure.

According to example embodiments of the present invention, it is possible to provide multilayer ceramic capacitors that are each able to reduce or prevent a decrease in high temperature reliability.

The above and other elements, features, steps, characteristics and advantages of the present invention will become more apparent from the following detailed description of the example embodiments with reference to the attached drawings.

BRIEF DESCRIPTION OF THE DRAWINGS

FIG. 10 is a table showing evaluation results of Examples and Comparative Examples.

DETAILED DESCRIPTION OF THE EXAMPLE EMBODIMENTS

Multilayer Ceramic Capacitor

Figure 1:
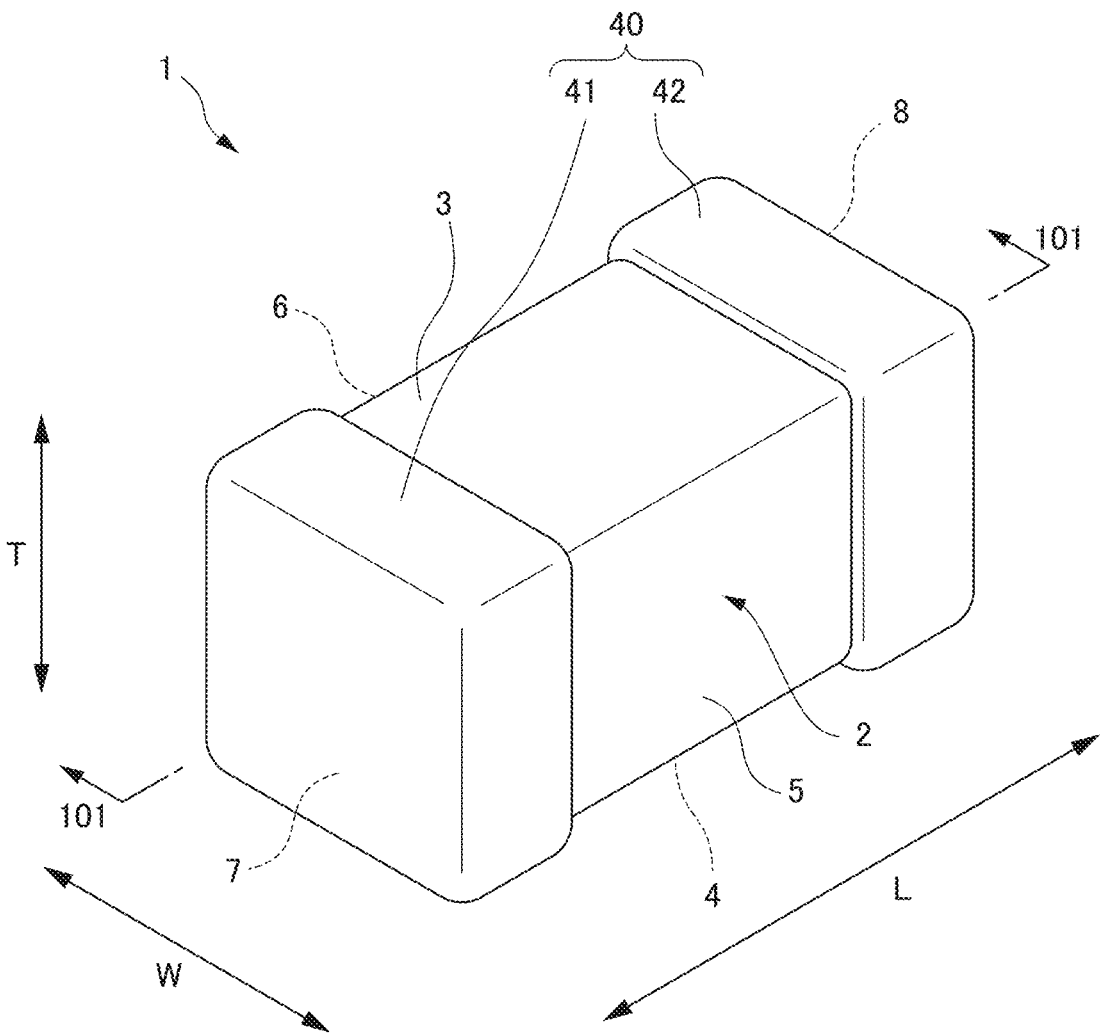
FIG. 1 is an external perspective view of a multilayer ceramic capacitor according to an example embodiment of the present invention.
Figure 2:
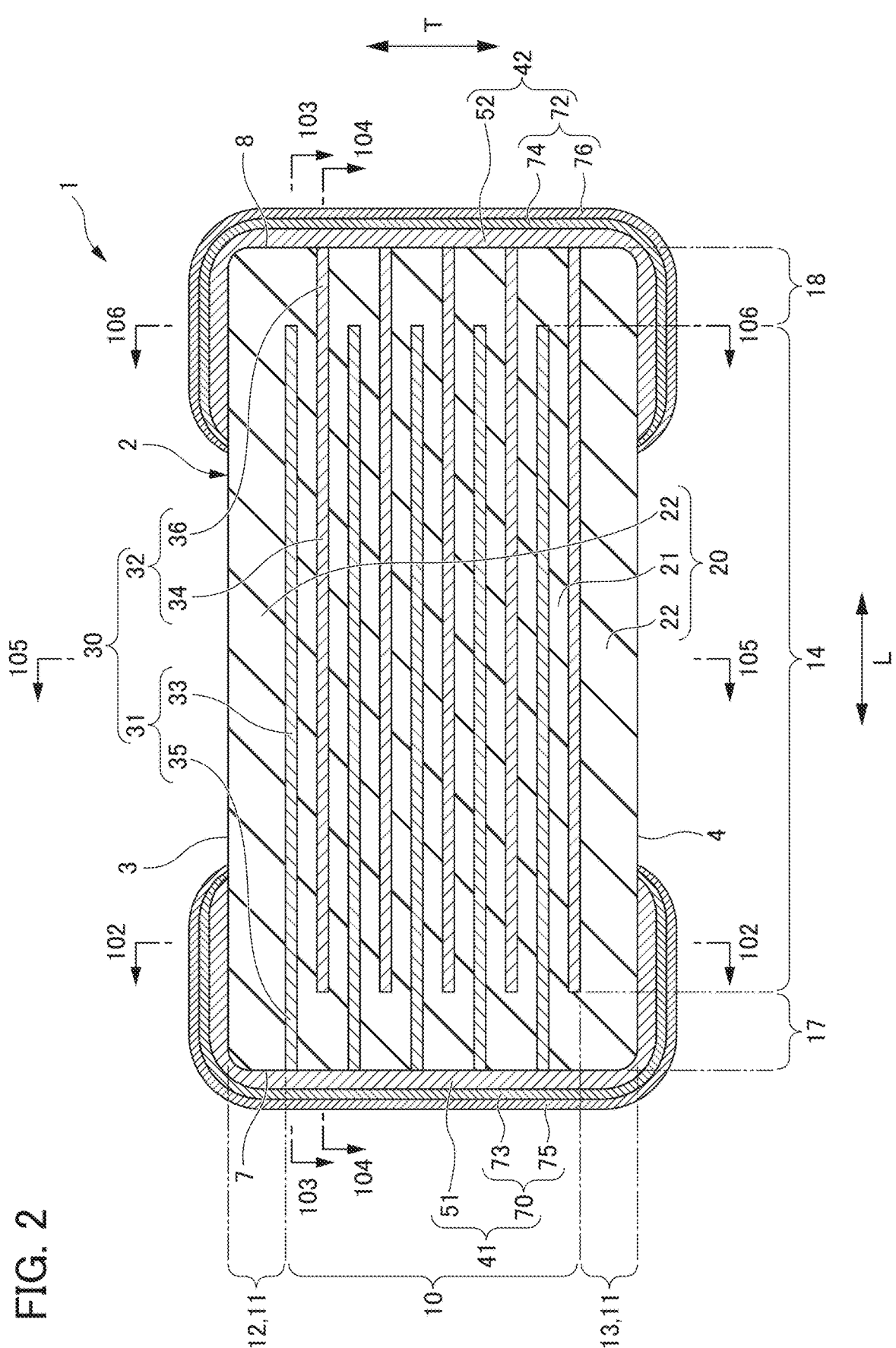
FIG. 2 is a cross-sectional view taken along the line 101-101 of FIG. 1.
Figure 3:
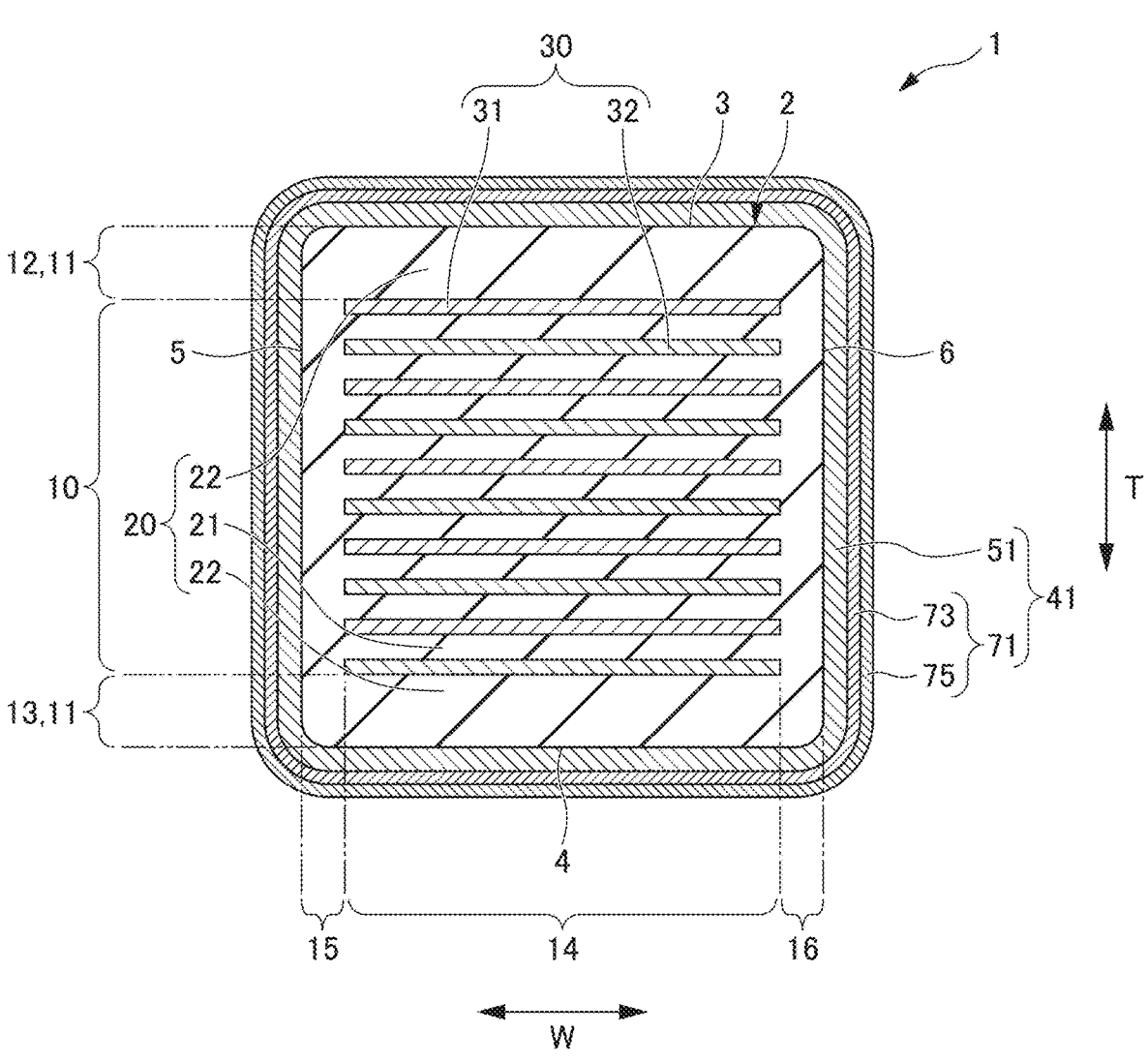
FIG. 3 is a cross-sectional view taken along the line 102-102 of FIG. 2.
Figure 4:
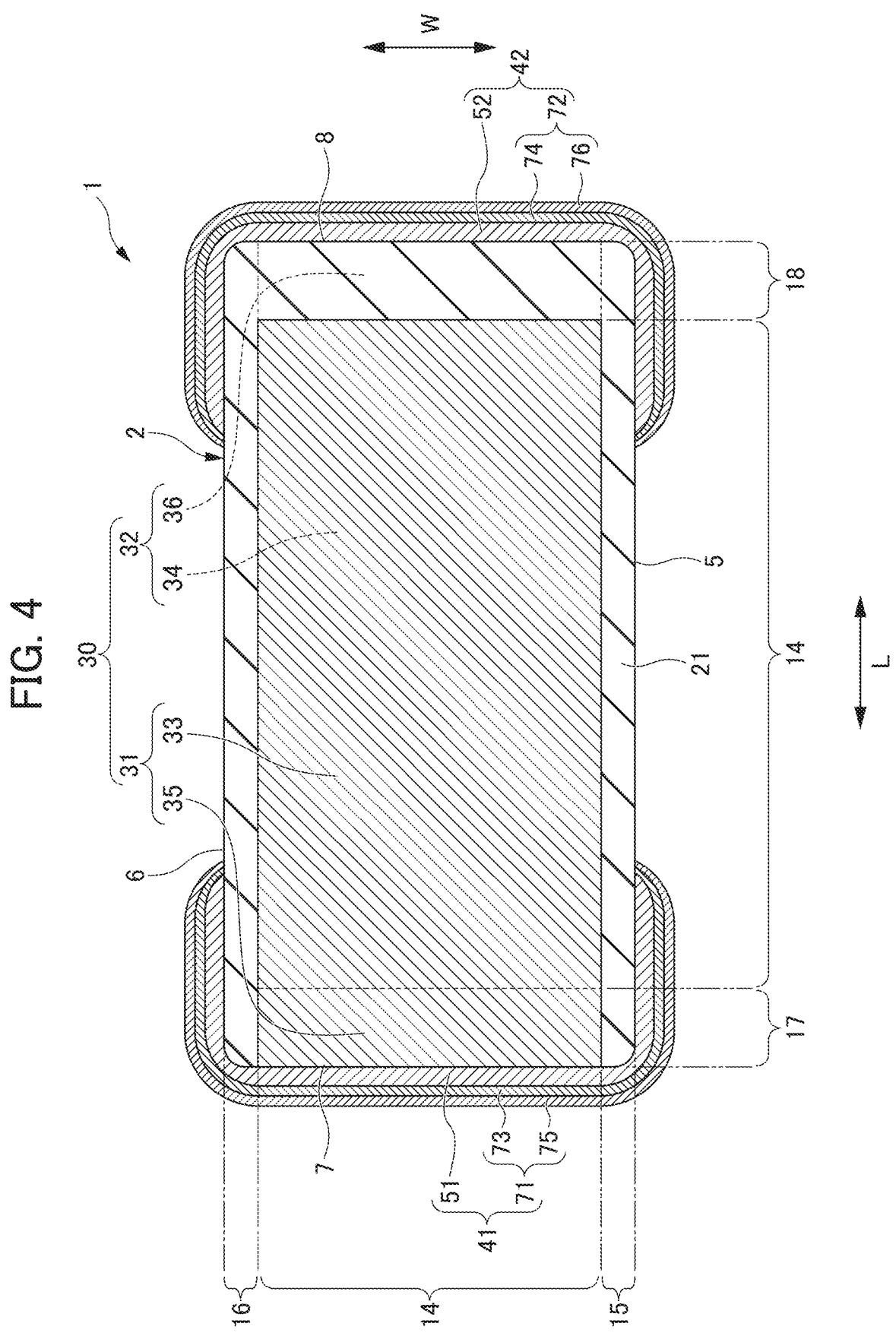
FIG. 4 is a cross-sectional view taken along the line 103-103 of FIG. 2.
Figure 5:
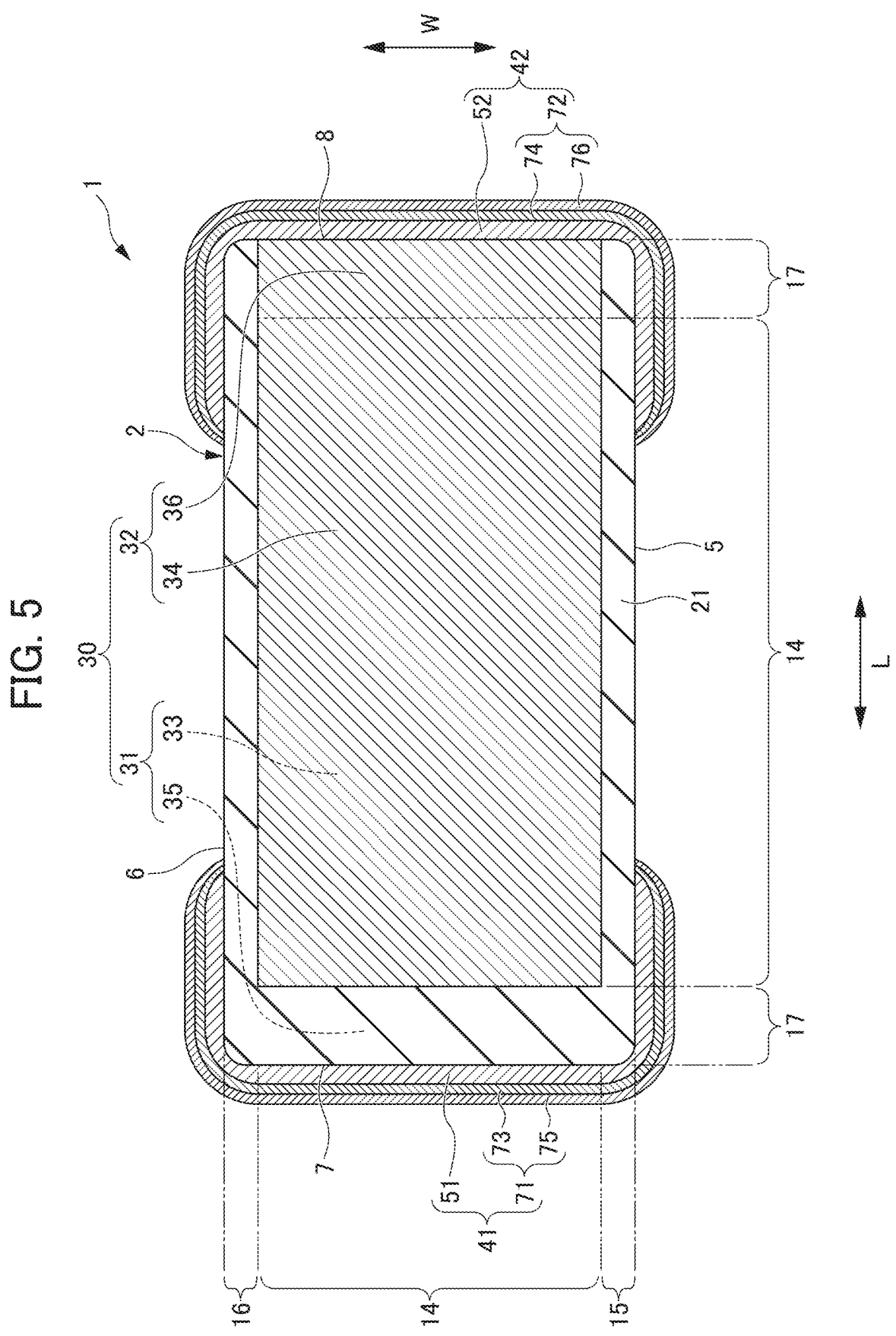
FIG. 5 is a cross-sectional view taken along the line 104-104 of FIG. 2.

A multilayer ceramic capacitor 1 according to an example embodiment of the present invention will be described with reference to the drawings. FIG. 1 is an external perspective view of a multilayer ceramic capacitor 1 according to an example embodiment of the present invention. FIG. 2 is a cross-sectional view taken along the line 101-101 of FIG. 1. FIG. 3 is a cross-sectional view taken along the line 102-102 of FIG. 2. FIG. 4 is a cross-sectional view taken along the line 103-103 of FIG. 2. FIG. 5 is a cross-sectional view taken along the line 104-104 of FIG. 2.

As shown in FIG. 1, the multilayer ceramic capacitor 1 has a rectangular or substantially rectangular parallelepiped shape. The multilayer ceramic capacitor 1 includes a multilayer body 2 having a substantially rectangular parallelepiped shape and a pair of external electrodes 40 spaced apart from each other at both end portions of the multilayer body 2.

In FIG. 1, an arrow T indicates a height direction of the multilayer ceramic capacitor 1 and the multilayer body 2. The height direction T also refers to a thickness direction and a of lamination (stacking) direction 41 the multilayer ceramic capacitor 1 and the multilayer body 2. In FIG. 1, an arrow L indicates a length direction orthogonal or substantially orthogonal to the height direction T of the multilayer ceramic capacitor 1 and the multilayer body 2. In FIG. 1, an arrow W indicates a width direction orthogonal or substantially orthogonal to the height direction T and the length direction L of the multilayer ceramic capacitor 1 and the multilayer body 2. The pair of external electrodes 40 is respectively provided at one end and the other end of the multilayer body 2 in the length direction L.

The cross section shown in FIG. 2 is defined as an LT cross section. The cross section shown in FIG. 3 is defined as a WT cross section. The cross section shown in FIG. 4 and the cross section shown in FIG. 5 are defined as an LW cross sections.

Multilayer Body

Two surfaces of the multilayer body 2 opposed to each other in the height direction T are defined as a first main surface 3 and a second main surface 4. Two surfaces opposed to each other in the length direction L orthogonal or substantially orthogonal to the height direction T of the multilayer body are defined as a first end surface 7 and a second end surface 8. Two surfaces opposed to each other in the width direction W orthogonal or substantially orthogonal to the height direction T and the length direction L of the multilayer body 2 are defined as a first lateral surface 5 and a second lateral surface 6.

As shown in FIG. 1, the multilayer body 2 has a rectangular or substantially rectangular parallelepiped shape. The length in the length direction L of the multilayer body 2 may not be longer than the length in the width direction W. The shapes of the corner portions of the multilayer body 2 and the ridge portions of the multilayer body 2 are preferably rounded. Each of the corner portions is a portion where the three surfaces of the multilayer body intersect. Each of the ridge portions is a portion where two surfaces of the multilayer body intersect. A portion or the whole of the surface of the multilayer body 2 may have unevenness or the like.

The size of the multilayer body 2 is not limited. A preferable dimension in the length direction L of the multilayer body 2 is about 0.2 mm or more and about 6 mm or less, for example. A preferable dimension in the height direction T of the multilayer body 2 is about 0.05 mm or more and about 5 mm or less, for example. The length of the multilayer body 2 in the width direction W is preferably about 0.1 mm or more and about 5 mm or less, for example.

Segmentation in Height Direction

As shown in FIGS. 2 and 3, the multilayer body 2 is divided into an inner layer portion 10 and main surface-side outer layer portions 11 in the height direction T. The main surface-side outer layer portions 11 include a first main surface-side outer layer portion 12 and a second main surface-side outer layer portion 13. The first main surface-side outer layer portion 12 and the second main surface-side outer layer portion 13 sandwich the inner layer portion 10 in the height direction T. That is, the multilayer body 2 is divided into the first main surface-side outer layer portion 12, the inner layer portion 10, and the second main surface-side outer layer portion 13.

Dielectric Layers

The inner layer portion 10 includes a plurality of dielectric layers 20 and a plurality of internal electrode layers 30 alternately laminated in the height direction T. The inner layer portion 10 includes the internal electrode layers 30 from an internal electrode layer 30 positioned closest to the first main surface 3 to an internal electrode layer 30 positioned closest to the second main surface 4 in the height direction T. In the inner layer portion 10, the plurality of internal electrode layers 30 are opposed to each other with the dielectric layer 20 interposed therebetween. The inner layer portion 10 is a portion that substantially functions as a capacitor for generating capacitance. The dielectric layers 20 included in the inner layer portion 10 are defined as inner dielectric layers 21. The dielectric layers 20 included in the first main surface-side outer layer portion 12 and the dielectric layers 20 included in the second main surface-side outer layer portion 13 are each defined as an outer dielectric layer 22.

The plurality of dielectric layers 20 are made of a dielectric material. The dielectric material includes at least one of calcium, zirconium, or strontium, and includes a perovskite-type structure. More specifically, the dielectric material is a temperature compensating dielectric material with a small rate of change of capacitance with temperature, and includes at least one of calcium, zirconium, or strontium as a main component of the dielectric material. For example, in the dielectric material, at least one calcium or strontium makes up the A site of the perovskite-type structure ($ABO_3$), and at least one of zirconium, titanium, or hafnium make ups the B site of the perovskite structure.

Specific examples of the main component of the dielectric material include ceramics including dielectric components such as barium titanate, calcium titanate, strontium titanate, titanium oxide, or calcium zirconate. The multilayer ceramic capacitor 1 of the present example embodiment is a multilayer ceramic capacitor for temperature compensation.

The dielectric material is obtained by adding additives to these main components. Examples of the additive include oxides of manganese, magnesium, dysprosium, or chromium, rare earth elements such as vanadium, samarium, europium, gadolinium, terbium, holmium, erbium, thulium, ytterbium, or yttrium, oxides of cobalt, nickel, lithium, boron, sodium, potassium, or silicon, or glass, in addition to hafnium, silicon, or calcium. Among them, dysprosium and yttrium are preferable as the rare earth elements, for example.

The thickness of each of the dielectric layers 20 is preferably about 0.2 μm or more and about 10 μm or less, for example. The number of the laminated dielectric layers 20 is preferably 15 or more and 1200 or less. The number of layers of the dielectric layer 20 is the sum of the number of the inner dielectric layers 21 and the number of the outer dielectric layers 22.

Internal Electrode Layer

The plurality of internal electrode layers 30 includes a plurality of first internal electrode layers 31 and a plurality of second internal electrode layers 32. The first internal electrode layers 31 and the second internal electrode layers 32 are alternately provided in the height direction T with the dielectric layer 20 interposed therebetween. The first internal electrode layers 31 each extend toward the first end surface 7 and are exposed at the first end surface 7. The second internal electrode layers 32 each extend toward the second end surface 8 and are exposed at the second end surface 8.

As shown in FIG. 4, each of the first internal electrode layers 31 is divided into a first counter portion 33 and a first extension portion 35. Each of the first counter portions 33 is opposed to the second internal electrode layer 32 with the dielectric layer 20 interposed therebetween. Each of the first extension portions 35 extends from the first counter portion 33 toward the first end surface 7. The first extension portion 35 is exposed at the first end surface 7.

As shown in FIG. 5, each of the second internal electrode layers 32 is divided into a second counter portion 34 and a second extension portion 36. Each of the second counter portions 34 is opposed to the first internal electrode layer 31 with the dielectric layer 20 interposed therebetween. The second extension portion 36 extends from the second counter portion 34 toward the second end surface 8. The second extension portion 36 is exposed at the second end surface 8.

In the multilayer ceramic capacitor 1, the first counter portion 33 and the second counter portion 34 are opposed to each other with the dielectric layer 20 interposed therebetween, such that a capacitance is generated. With such a configuration, the characteristics of the capacitor are developed in the multilayer ceramic capacitor 1.

The shape of each of the first counter portions 33 and the second counter portions 34 is not limited. A preferable shape of each of the first counter portions 33 and the second counter portions 34 is a rectangular or substantially rectangular shape, for example. Similarly, the shape of each of the first extension portions 35 and the second extension portions 36 are not limited. A preferable shape of each of the first extension portions 35 and the second extension portions 36 is a rectangular shape. In the above-described rectangular shape, each of the rectangular corner portions may have a rounded shape. Each of the rectangular corner portions may have an oblique shape.

The length of each of the first counter portions 33 in the width direction W and the length of each of the first extension portion 35 in the width direction W may be the same. Either one of the length of each of the first counter portions 33 in the width direction W and the length of each of the first extension portions 35 in the width direction W may be short. The length of each of the second counter portions 34 in the width direction W and the length of each of the second extension portions 36 in the width direction W may be the same. Either one of the length of each of the second counter portions 34 in the width direction W and the length of each of the second extension portions 36 in the width direction W may be short.

Examples of the material of each of the first internal electrode layers 31 and the second internal electrode layers 32 include an electrically conductive material such as a metal such as nickel, copper, silver, palladium, or gold, or an alloy including at least one of these metals. When an alloy is used, examples of the material of each of the first internal electrode layers 31 and the second internal electrode layers 32 is an alloy of silver and palladium.

Examples of preferable thicknesses of each of the first internal electrode layers 31 and the second internal electrodes layer 32 are about 0.2 μm or more and about 2.0 μm or less, for example. A preferable number of layers of the sum of the first internal electrode layers 31 and the second internal electrode layers 32 is 15 or more and 1000 or less.

Main Surface-side Outer Layer Portion

As shown in FIGS. 2 and 3, a portion of an aggregate of the plurality of dielectric layers 20 positioned between the first main surface 3 and the internal electrode layer 30 closest to the first main surface 3 is defined as the first main surface-side outer layer portion 12. The first main surface-side outer layer portion 12 is adjacent to the first main surface 3 of the multilayer body 2. A portion of an aggregate of the plurality of dielectric layers 20 positioned between the second main surface 4 and the internal electrode layer 30 closest to the second main surface 4 is defined as the second main surface-side outer layer portion 13. The second main surface-side outer layer portion 13 is adjacent to the second main surface 4 of the multilayer body 2. The dielectric layers 20 of the first main surface-side outer layer portion 12 and the second main surface-side outer layer portion 13 may be the same or substantially the same as the dielectric layers 20 of the inner layer portion 10. The material of the inner dielectric layers 21 and the material of the outer dielectric layers 22 may be the same.

Effective Layer Portion

A portion where the first counter portion 33 of each of the first internal electrode layers 31 and the second counter portion 34 of each of the second internal electrode layers 32 are opposed each other is defined as an effective layer portion 14. The effective layer portion 14 includes the dielectric layers 20 and the internal electrode layers 30 that are alternately laminated. The effective layer portion 14 is a portion of the inner layer portion 10. FIGS. 4 and 5 each show the range of the effective layer portion 14 in the width direction W and the length direction L. The effective layer portion 14 is a portion of the inner layer portion 10 without a side gap described later and an end gap described later. The effective layer portion 14 is also defined as a capacitance generation portion or a capacitor effective portion.

Segmentation in Direction W

The multilayer body 2 is divided into a first lateral surface-side outer layer portion 15, the effective layer portion 14, and a second lateral surface-side outer layer portion 16 in the width direction W. The first lateral surface-side outer layer portion 15 is a portion including the dielectric layers 20 positioned between the effective layer portion 14 and the first lateral surface 5. The second lateral surface-side outer layer portion 16 is a portion including the dielectric layers 20 positioned between the effective layer portion 14 and the second lateral surface 6. FIG. 3, FIG. 4, and FIG. 5 each show the ranges of the first lateral surface-side outer layer portion 15, the effective layer portion 14, and the second lateral surface-side outer layer portion 16 in the width direction W. The first lateral surface-side outer layer portion 15 and the second lateral surface-side outer layer portion 16 are each defined as a W gap or a side gap.

Segmentation in Length Direction L

The multilayer body 2 is divided into a first end surface-side outer layer portion 17, the effective layer portion 14, and a second end surface-side outer layer portion 18 in the length direction L. The first end surface-side outer layer portion 17 is a portion including the dielectric layers 20 and the first extension portions 35 positioned between the effective layer portion 14 and the first end surface 7. The first end surface-side outer layer portion 17 is an aggregate of portions of the plurality of dielectric layers 20 adjacent to the first end surface 7 and the plurality of first extension portions 35. The second end surface-side outer layer portion 18 is a portion including the dielectric layers 20 and the second extension portion 36 positioned between the effective layer portion 14 and the second end surface 8. The second end surface-side outer layer portion 18 is an aggregate of portions of the plurality of dielectric layers 20 adjacent to the second end surface 8 and the plurality of second extension portions 36. FIG. 2, FIG. 4, and FIG. 5 each show the ranges of the first end surface-side outer layer portion 17, the effective layer portion 14, and the second end surface-side outer layer portion 18 in the length direction L. The first end surface-side outer layer portion 17 and the second end surface-side outer layer portion 18 are each defined as an L gap or an end gap.

External Electrode

The external electrodes 40 includes a first external electrode 41 and a second external electrode 42. The first external electrode 41 is an external electrode on the first end surface 7 of the multilayer body 2. The second external electrode 42 is an external electrode on the second end surface 8 side of the multilayer body 2.

The basic configurations of the first external electrode 41 and the second external electrode 42 preferably are the same. The first external electrode 41 and the second external electrode 42 have a substantially plane symmetrical shape with respect to the WT cross section at the center in the length direction L of the multilayer ceramic capacitor 1.

The first external electrode 41 is on the first end surface 7. The first external electrode 41 contacts the first extension portion 35 of each of the plurality of first internal electrode layers 31 exposed at the first end surface 7. The first external electrode 41 is electrically connected to each of the plurality of first internal electrode layers 31. The first external electrode 41 may also be on a portion of the first main surface 3 and a portion of the second main surface 4, and also on a portion of the first lateral surface 5 and a portion of the second lateral surface 6. In the present example embodiment, the first external electrode 41 extends from the first end surface 7 to a portion of the first main surface 3 and a portion of the second main surface 4, and to a portion of the first lateral surface 5 and a portion of the second lateral surface 6.

The second external electrode 42 is on the second end surface 8. The second external electrode 42 contacts the second extension portion 36 of each of the plurality of second internal electrode layers 32 exposed at the second end surface 8. The second external electrode 42 is electrically connected to each of the plurality of second internal electrode layers 32. The second external electrode 42 may also be on a portion of the first main surface 3 and a portion of the second main surface 4, and also on a portion of the first lateral surface 5 and a portion of the second lateral surface 6. In the present example embodiment, the second external electrode 42 extends from the second end surface 8 to a portion of the first main surface 3 and a portion of the second main surface 4, and to a portion of the first lateral surface 5 and a portion of the second lateral surface 6.

In the multilayer body 2, the first counter portion 33 of each of the first internal electrode layers 31 and the second counter portion 34 of each of the second internal electrode layers 32 are opposed to each other with the dielectric layer 20 interposed therebetween, such that a capacitance is generated. Therefore, the characteristic of the capacitor is developed between the first external electrode 41 to which the plurality of first internal electrodes layer 31 are connected and the second external electrode 42 to which the plurality of second internal electrode layers 32 are connected.

Base Electrode Layer

As shown in FIGS. 2, 4, and 5, the first external electrode 41 includes a first base electrode layer 51 and a first plated layer 71. The first plated layer 71 is on the first base electrode layer 51. The second external electrode 42 includes a second base electrode layer 52 and a second plated layer 72. The second plated layer 72 is on the second base electrode layer 52.

The first base electrode layer 51 is on the first end surface 7. The first base electrode layer 51 contacts the first extension portion 35 of each of the plurality of first internal electrode layers 31 exposed at the first end surface 7. The first base electrode layer 51 extends from the first end surface 7 to a portion of the first main surface 3 and a portion of the second main surface 4, and to a portion of the first lateral surface 5 and a portion of the second lateral surface 6.

The second base electrode layer 52 is on the second end surface 8. The second base electrode layer 52 contacts the second extension portion 36 of each of the plurality of second internal electrode layers 32 exposed at the second end surface 8. The second base electrode layer 52 extends from the second end surface 8 to a portion of the first main surface 3 and a portion of the second main surface 4, and to a portion of the first lateral surface 5 and a portion of the second lateral surface 6.

Each of the first base electrode layer 51 and the second base electrode layer 52 is a fired layer. The fired layer preferably includes a metal component. The fired layer preferably includes at least one of a glass component or a ceramic component in addition to a metal component. The metal component includes, for example, at least one of copper, nickel, silver, or palladium, an alloy of silver and palladium, gold, or the like. The glass component includes, for example, at least one of boron, silicon, barium, magnesium, aluminum, or lithium, or the like. The ceramic component may be a ceramic material similar to the dielectric layers 20. The ceramic component may be a ceramic material different from the dielectric layers 20. The ceramic component includes, for example, at least one of barium titanate, calcium titanate, a mixed crystal material obtained by replacing a portion of barium of barium titanate with calcium, strontium titanate, or calcium zirconate, or the like.

Examples of the fired layer include a layer formed by coating a multilayer body with an electrically conductive paste including glass and metal and firing the resultant product. The fired layer is formed by simultaneously firing a multilayer chip before firing, which is a material of a multilayer body including a plurality of internal electrode layers and a plurality of dielectric layers, and an electrically conductive paste applied to the multilayer chip. Alternatively, the fired layer is formed by firing a multilayer chip to obtain a multilayer body, then applying an electrically conductive paste to the multilayer body, and firing the resultant product. In a case in which the electrically conductive paste is fired after the multilayer body is obtained, the fired layer is preferably formed by firing the electrically conductive paste to which a ceramic material is added instead of the glass component. When an electrically conductive paste to which a ceramic material is added is used, the ceramic material to be added is preferably a ceramic material of the same kind as the dielectric layer. The fired layer may include a plurality of layers.

An example of a preferable thickness in the length direction L of the first base electrode layer 51 on the first end surface 7 is about 10 μm or more and about 200 μm or less in the middle portion in the height direction T and the width direction W of the first base electrode layer 51.

An example of a preferable thickness in the length direction L of the second base electrode layer 52 on the second end surface 8 is about 10 μm or more and about 200 μm or less in the middle portion in the height direction T and the width direction W of the second base electrode layer 52.

In a case where the first base electrode layer 51 is also provided on a portion of at least one of the first main surface 3 or the second main surface 4, an example of a preferable thickness in the height direction T of the first base electrode layer 51 provided on this portion is about 3 μm or more and 40 μm or less in the middle portion in the length direction L and the width direction W of the first base electrode layer 51 provided on this portion.

In a case where the first base electrode layer 51 is also provided on a portion of at least one of the first lateral surface 5 or the second lateral surface 6, an example of a preferable thickness in the width direction W of the first base electrode layer 51 provided on this portion is about 3 μm or more and 40 μm or less in the middle in the length direction L and the height direction T of the first base electrode layer 51 provided on this portion.

In a case where the second base electrode layer 52 is also provided on a portion of at least one of the first main surface 3 or the second main surface 4, an example of a preferable thickness in the height direction T of the second base electrode layer 52 provided on this portion is about 3 μm or more and 40 μm or less in the middle in the length direction L and the width direction W of the second base electrode layer 52 provided on this portion.

In a case where the second base electrode layer 52 is also provided on a portion of at least one of the first lateral surface 5 or the second lateral surface 6, an example of a preferable thickness of the second base electrode layer 52 in the width direction W provided on this portion is about 3 μm or more and 40 μm or less in the middle of the second base electrode layer 52 in the length direction L and the height direction T provided on this portion.

The first plated layer 71 covers the first base electrode layer 51. The second plated layer 72 covers the second base electrode layer 52.

The first plated layer 71 and the second plated layer 72 may include, for example, at least one of copper, nickel, tin, silver, or palladium, an alloy of silver and palladium, gold, or the like. Each of the first plated layer 71 and the second plated layer 72 may include a plurality of layers. A preferable configuration of the first plated layer 71 and the second plated layer 72 is a two-layer configuration in which a tin plated layer is provided on a nickel plated layer.

The first plated layer 71 covers the first base electrode layer 51. In the present example embodiment, the first plated layer 71 includes a first nickel plated layer 73 and a first tin plated layer 75. The first tin plated layer 75 is on the first nickel plated layer 73.

The second plated layer 72 covers the second base electrode layer 52. In the present example embodiment, the second plated layer 72 includes a second nickel plated layer 74 and a second tin plated layer 76. The second tin plated layer 76 is on the second nickel plated layer 74.

The nickel plated layer reduces or prevents the erosion of the first base electrode layer 51 and the second base electrode layer 52 by solder when the multilayer ceramic capacitor 1 is mounted. The tin plated layer improves wettability of solder when the multilayer ceramic capacitor 1 is mounted. The tin plated layer facilitates mounting of the multilayer ceramic capacitor 1. The thickness of each of the first nickel plated layer 73, the first tin plated layer 75, the second nickel plated layer 74, and the second tin plated layer 76 is preferably about 2 μm or more and about 10 μm or less, for example.

Each of the external electrodes 40 may include an electrically conductive resin layer including electrically conductive particles and a thermosetting resin. When each of the external electrodes 40 includes an electrically conductive resin layer, the electrically conductive resin layer may cover the fired layer. When the electrically conductive resin layer covers the fired layer, the electrically conductive resin layer is provided between the fired layer and the plated layer. The fired layer corresponds to the first base electrode layer 51 and the second base electrode layer 52. The plated layer corresponds to the first plated layer 71 and the second plated layer 72. The electrically conductive resin layer may completely cover the fired layer. The electrically conductive resin layer may cover a portion of the fired layer.

The electrically conductive resin layer including a thermosetting resin is more flexible than an electrically conductive layer including a plating film or a fired product of an electrically conductive paste. Therefore, when a physical impact or an impact caused by a thermal cycle is applied to the multilayer ceramic capacitor, the electrically conductive resin layer functions as a buffer layer. Therefore, the electrically conductive resin layer reduces or prevents the generation of cracks in the multilayer ceramic capacitor.

Examples of metals of the electrically conductive particles include silver, copper, nickel, tin, or bismuth, or alloys including at least two of these metals. The electrically conductive particles preferably include silver. Examples of conductive particles include silver metal powder. Silver has the lowest specific resistance among metals. Silver is suitable for electrode materials. Silver is a noble metal. Silver is difficult to oxidize. Silver has high weatherability. For these reasons, silver metal powder is suitable as conductive particles.

The electrically conductive particles may be silver-coated metal powders. When conductive particles whose surface is silver-coated are used, the metal powder is preferably a powder of copper, nickel, tin, or bismuth, or an alloy thereof. It is preferable to use silver-coated metal powder to maintain silver characteristics and make the metal of the base material inexpensive.

The electrically conductive particles may be provided by subjecting copper or nickel to an antioxidant treatment. The electrically conductive particles may be metal powder in which the surface of the metal powder is coated with tin, nickel, or copper. When a metal powder coated with tin, nickel, or copper is used on the surface of the metal powder, the metal powder is preferably silver, copper, nickel, tin, or bismuth, or an alloy powder including at least two of these metals.

The shape of the electrically conductive particles is not limited. Examples of the shape of the electrically conductive particles include a spherical shape and a flat shape. It is preferable to use a mixture of spherical metal powder and flat metal powder.

The electrically conductive particles included in the electrically conductive resin layer mainly ensure the electric conductivity of the electrically conductive resin layer. When the plurality of conductive particles are brought into contact with each other, an energizing path is provided inside the electrically conductive resin layer.

Examples of the resin of the electrically conductive resin layer may include at least one of various known thermosetting resins such as epoxy resin, phenol resin, urethane resin, silicone resin, or polyimide resin. Among them, an epoxy resin is one of the most suitable resins. The epoxy resin is excellent in heat resistance, moisture resistance, adhesiveness, and the like. The resin of the electrically conductive resin layer preferably includes a curing agent together with the thermosetting resin. When an epoxy resin is used as the base resin, the curing agent of the epoxy resin may be any of various known compounds such as phenolic, amine-based, acid anhydride-based, imidazole-based, active ester-based, or amideimide-based compounds.

The electrically conductive resin layer may include a plurality of layers. The thickness of the thickest portion of the electrically conductive resin layer is preferably about 10 μm or more and about 150 μm or less, for example.

The basic configuration of the multilayer ceramic capacitor 1 is described above. The preferable dimension in the length direction L of the multilayer ceramic capacitor 1 including the multilayer body 2 and the external electrode 40 is about 0.2 mm or more and about 6 mm or less, for example. The preferable dimension in the height direction T of the multilayer ceramic capacitor 1 is about 0.05 mm or more and about 5 mm or less, for example. The preferable dimension in the width direction W of the multilayer ceramic capacitor 1 is about 0.1 mm or more and about 5 mm or less, for example.

Segregation of Rare Earth

Figure 6A:
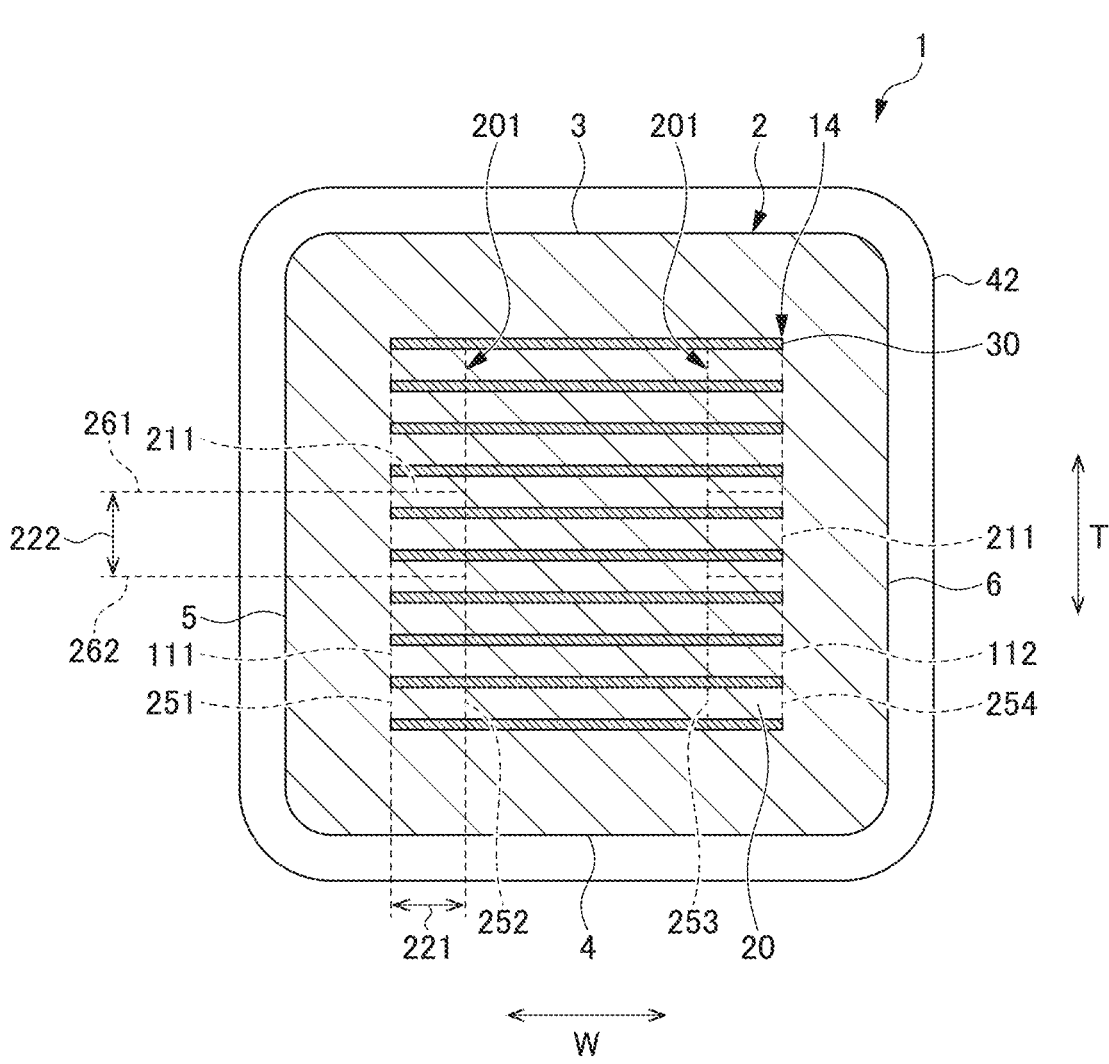
FIG. 6A is a cross-sectional view taken along the line 106-106 of FIG. 2.
Figure 6B:
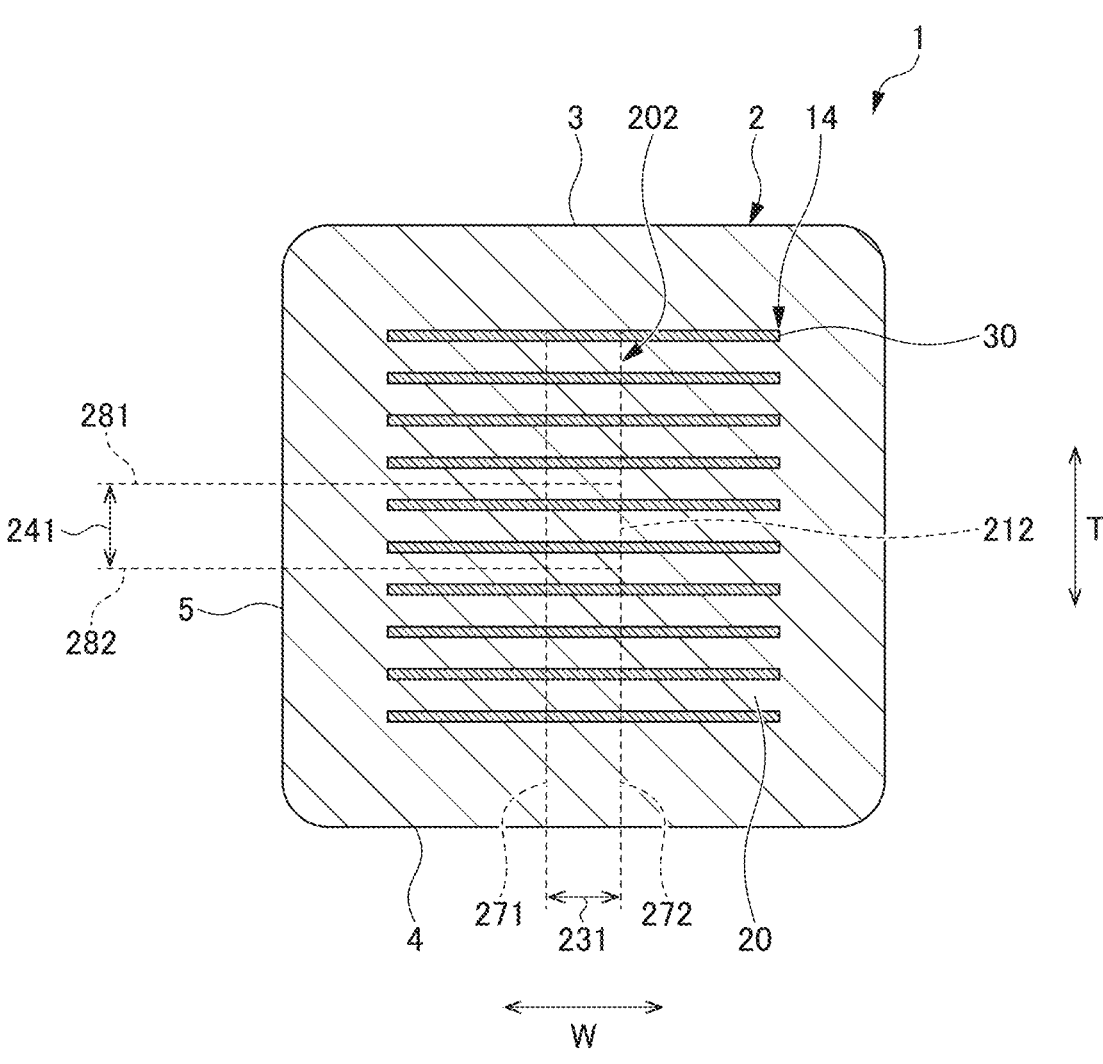
FIG. 6B is a cross-sectional view taken along the line 105-105 of FIG. 2.

In the multilayer ceramic capacitor 1 of the present example embodiment, segregation of the rare earth element is not uniform in the multilayer body 2. Hereinafter, a description will be provided with reference to FIGS. 6A and 6B, etc. FIG. 6A is a cross-sectional view taken along the line 106-106 of FIG. 2. FIG. 6B is a cross-sectional view taken along the line 105-105 of FIG. 2.

Effective Layer-Width Direction-End Portion and Effective Layer-Middle Portion

As shown in FIGS. 6A and 6B, the multilayer body 2 includes effective layer-width direction-end portions 201 and an effective layer-middle portion 202. As shown in FIG. 6A, the effective layer-width direction-end portions 201 include a portion in the vicinity of an end 111 adjacent to the first lateral surface 5 of the effective layer portion 14 and a portion in the vicinity of an end 112 adjacent to the second lateral surface 6 of the effective layer portion 14 in the WT cross section. On the other hand, as shown in FIG. 6B, the effective layer-middle portion 202 includes a middle portion of the effective layer portion 14 in the width direction W in the WT cross section. Hereinafter, a description will be provided in detail.

Effective Layer-Width Direction-End Portion

First, with reference to FIG. 6A, the effective layer width direction end portions 201 will be described. The effective layer-width direction-end portions 201 include a portion surrounded by lines 251 and 252 in the effective layer portion 14, and a portion surrounded by lines 253 and 254 in the effective layer portion 14.

The line 251 is positioned at the end 111 of the effective layer portion 14 adjacent to the first lateral surface 5. The line 252 is a line spaced by about 20 μm from the line 251 in the direction of the second lateral surface 6, for example. That is, the distance 221 between the lines 251 and 252 is about 20 μm, for example.

The line 254 is positioned at the end 112 of the effective layer portion 14 adjacent to the second lateral surface 6. The line 253 is a line spaced by about 20 μm from the line 254 in the direction of the first lateral surface 5, for example. That is, the distance between line 253 and line 254 is 20 μm, for example.

As described above, each of the effective layer-width direction-end portion 201 refers to a portion having a width of about 20 μm from each end of the effective layer portion 14 in the width direction W toward the inside of the effective layer portion 14, for example.

The above description has been made with reference to a cross section of the effective layer portion 14. The effective layer-width direction-end portion 201 continues at the same position as the position shown in FIG. 6A in the length direction L of the effective layer portion 14.

Effective Layer-Middle Portion

Next, the effective layer-middle portion 202 will be described with reference to FIG. 6B. The effective layer-middle portion 202 is a portion surrounded by the lines 271 and 272 in the effective layer portion 14. The lines 271 and 272 are positioned in the middle portion of the effective layer portion 14 in the width direction W so that the distance therebetween becomes about 20 μm, for example. That is, the distance 231 between the lines 271 and 272 is about 20 μm, for example.

As described above, the effective layer-middle portion 202 is a portion having a width of about 20 μm in the middle portion of the effective layer portion 14 in the width direction W, for example.

The above description has been made with reference to a cross section of the effective layer portion 14. The effective layer-middle portion 202 continues at the same position as the position shown in FIG. 6B in the length direction L of the effective layer portion 14.

Rare Earth Segregation Region

In the multilayer ceramic capacitor 1 of the present example embodiment, the multilayer body 2 includes a rare earth segregation region. The rare earth segregation region is a region in which rare earth elements are segregated.

In the multilayer ceramic capacitor 1 of the present example embodiment, in the WT cross section, the relationship between the segregation amount of the rare earth element in the rare earth segregation region in the effective layer-middle portion 202 and the segregation amount of the rare earth element in the rare earth segregation region in the effective layer-width direction-end portion 201 is expressed as the effective layer-middle portion 202>the effective layer-width direction-end portion 201. A description will be provided with reference to FIGS. 7A, 7B, 8A and 8B.

End Portion-Evaluation Region and Middle Portion-Evaluation Region

First, evaluation regions in the effective layer-width direction-end portion 201 and the effective layer-middle portion 202 will be described. The evaluation regions each refer to a measurement range for measuring the characteristics of the effective layer-width direction-end portion 201 and the effective layer-middle portion 202 such as the segregation amount of the rare earth element. The evaluation region of the effective layer-width direction-end portion 201 is defined as an end portion-evaluation region 211. The evaluation region of the effective layer-middle portion 202 is defined as a middle portion-evaluation region 212. As shown in FIGS. 6A and 6B, the end portion-evaluation region 211 and the middle portion-evaluation region 212 each have a square shape. The length of one side of each of the squares is about 20 μm, for example. The position in the height direction T of each of the end portion-evaluation region 211 and the middle portion-evaluation region 212 is positioned in the middle position in the height direction T of the effective layer portion 14.

Figure 7A:
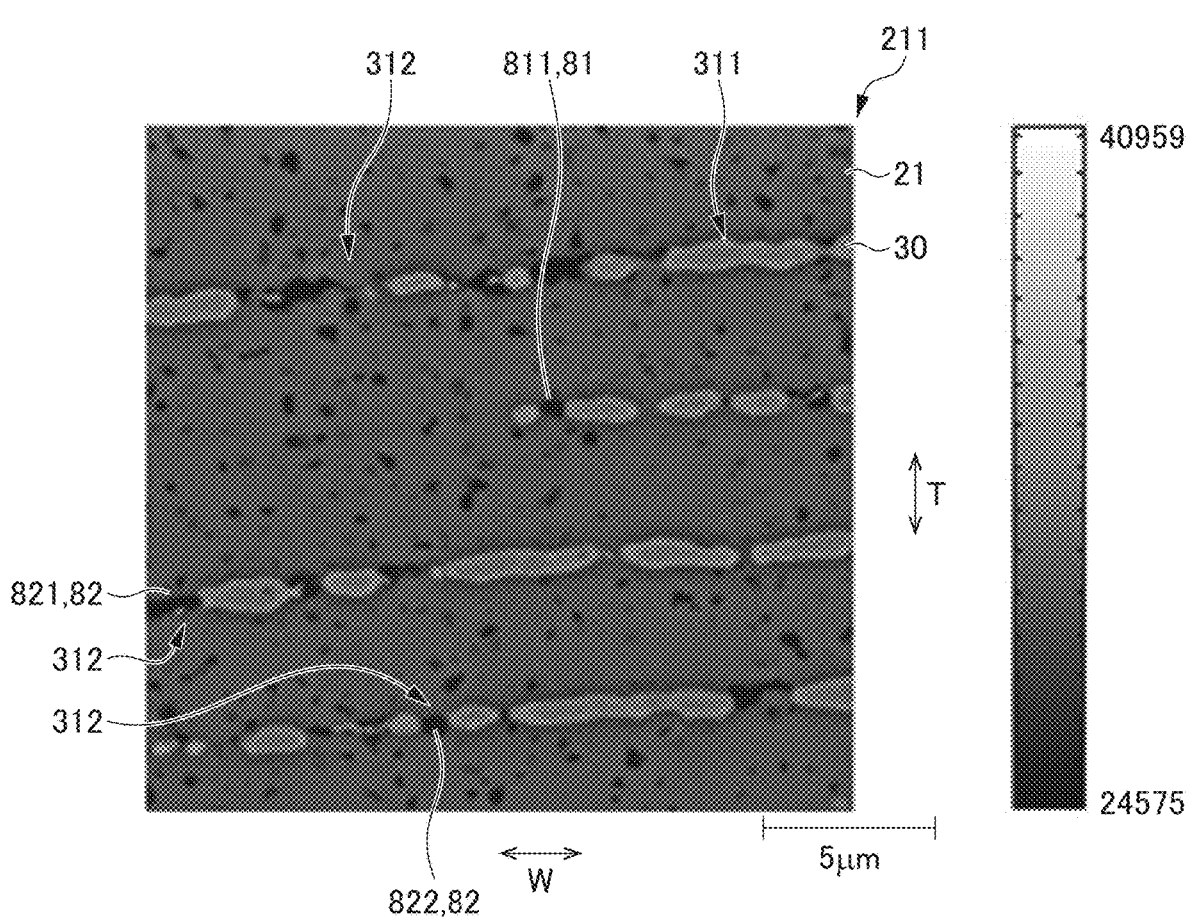
FIG. 7A is an electron microscope image of an end portion-evaluation region.
Figure 7B:
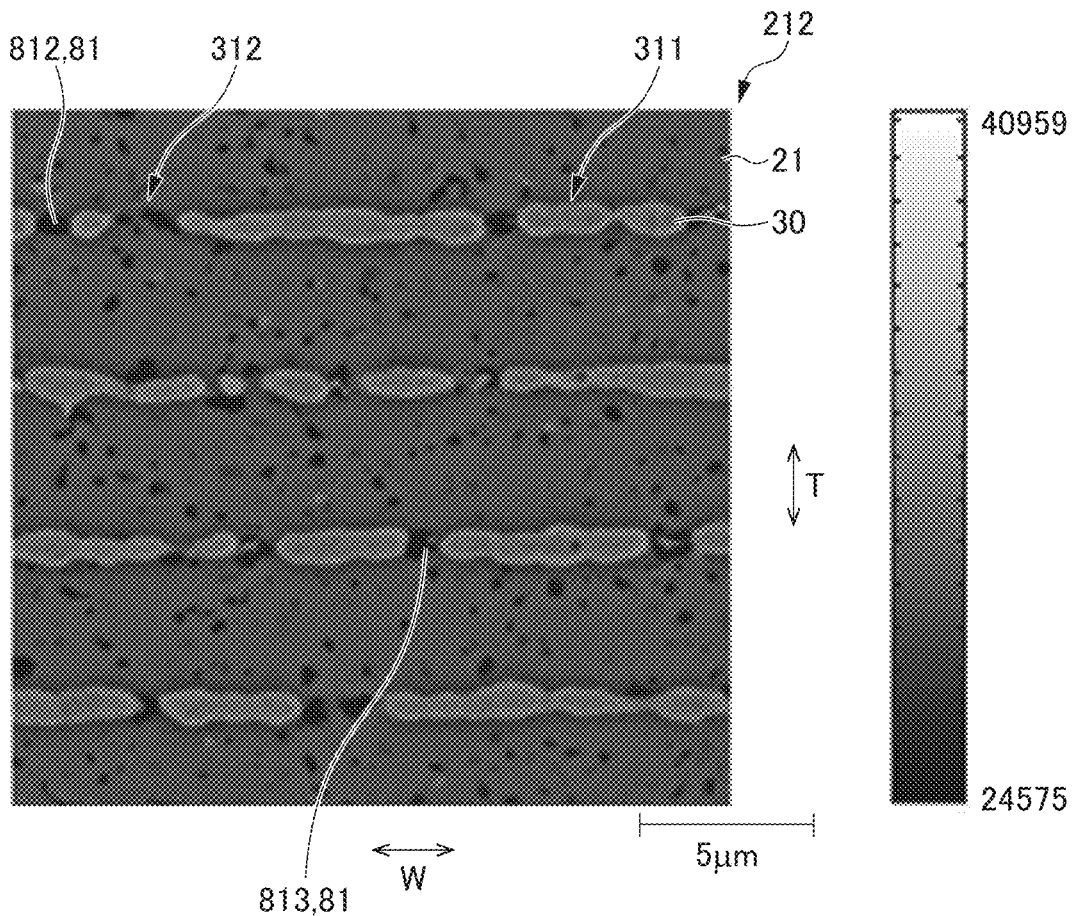
FIG. 7B is an electron microscope image of a middle portion-evaluation region.
Figure 8A:
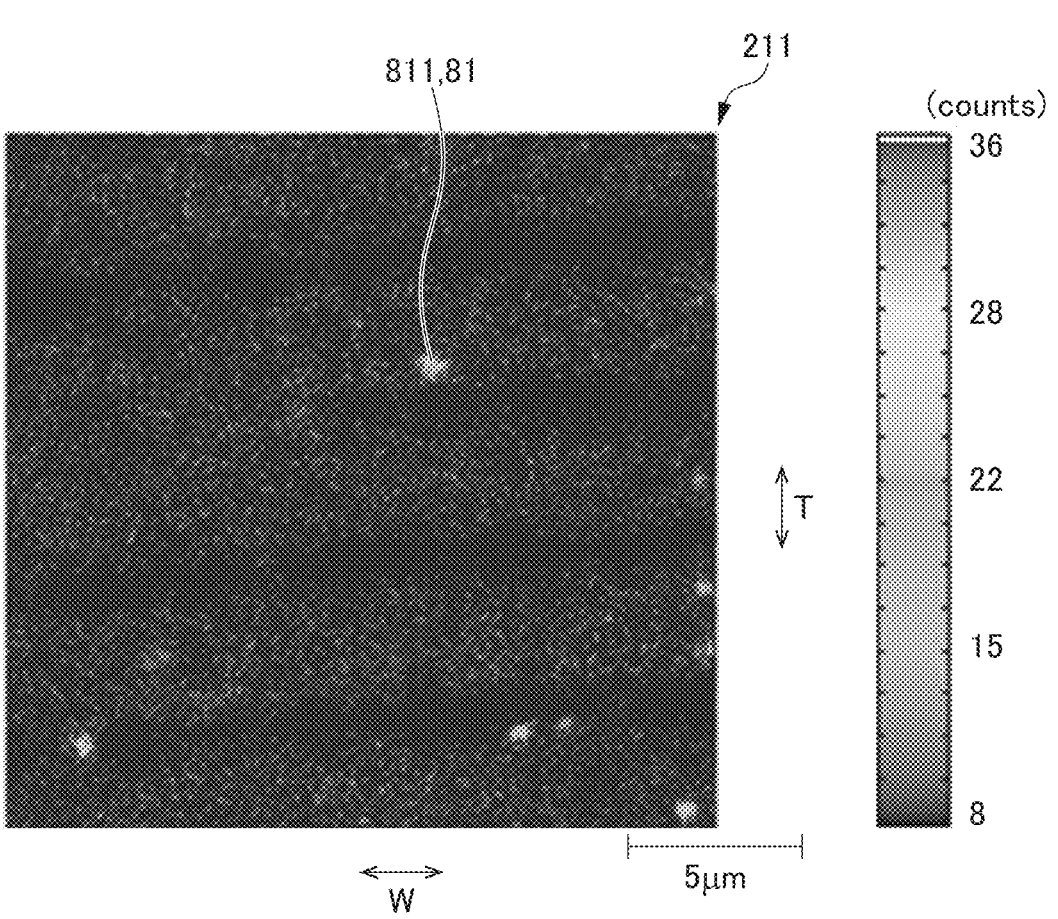
FIG. 8A is an FE-WDX image of an end portion-evaluation region and shows segregation of rare earth elements.
Figure 8B:
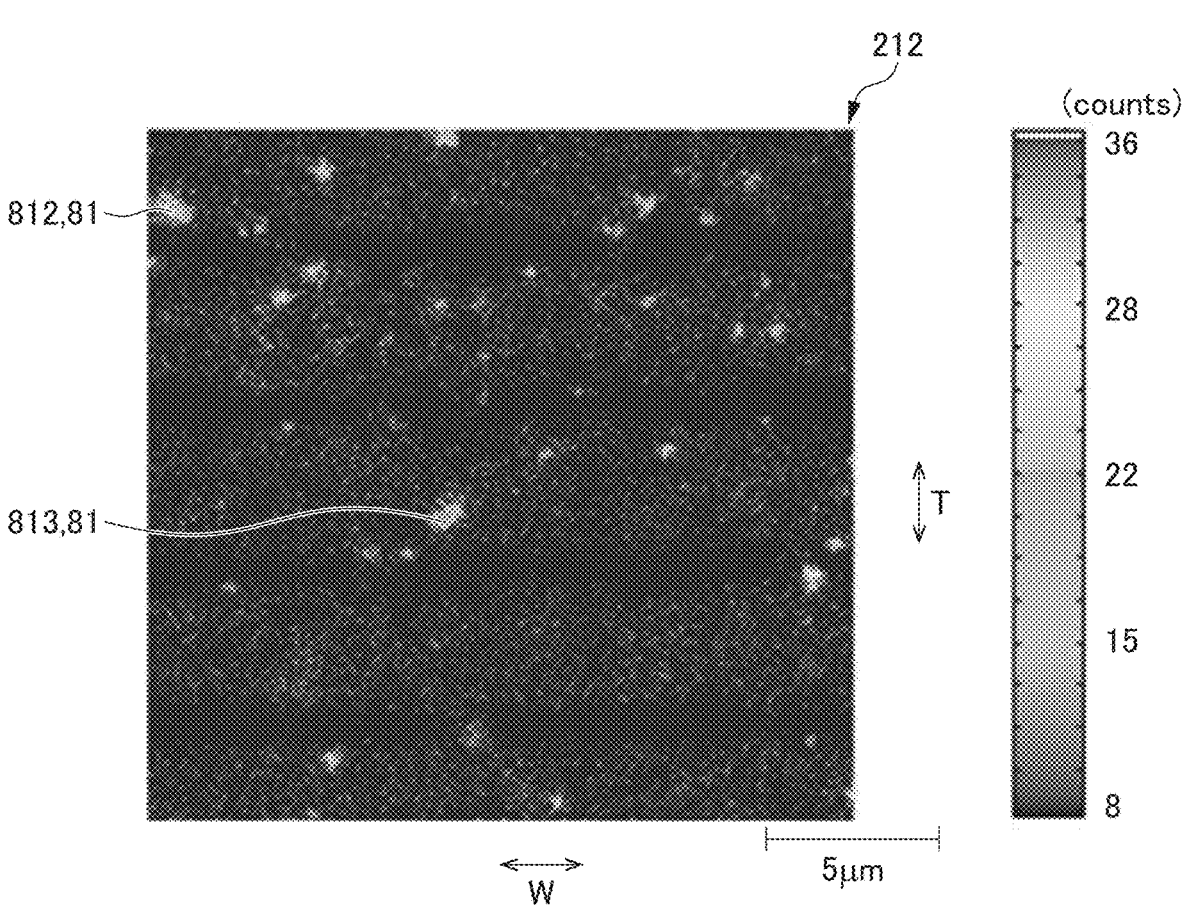
FIG. 8B is an FE-WDX image of a middle portion-evaluation region and shows segregation of rare earth elements.

FIG. 7A is an electron microscope image of the end portion-evaluation region 211. FIG. 7B is an electron microscope image of the middle portion-evaluation region 212. FIG. 8A is an image of the end portion-evaluation region 211 captured by a field emission-wavelength-dispersive X-ray spectrometry (FE-WDX). FIG. 8B is an FE-WDX image of the middle portion-evaluation region 212. FIGS. 8A and 8B each show the segregation of rare earth elements. The image shown in FIG. 7A and the image shown in FIG. 8A are images at the same position in the WT cross section. Similarly, the image shown in FIG. 7B and the image shown in FIG. 8B are images directed to the same position in the WT cross section.

In FIGS. 8A and 8B, a portion which appears to be white is the rare earth segregation region 81. In the end portion-evaluation region 211 shown in FIG. 8A, although the rare earth segregation region 81 is visible, the number of the rare earth segregation regions 81 is not large. On the other hand, in the middle portion evaluation region 212 shown in FIG. 8B, more rare earth segregation regions 81 are observed than in the end portion-evaluation region 211 shown in FIG. 8A.

In the middle portion-evaluation region 212 shown in FIG. 8B, the rare earth segregation regions 81 having larger area than those in the end portion-evaluation region 211 shown in FIG. 8A are easily observable. In the end portion-evaluation region 211 shown in FIG. 8A, a rare earth segregation region 811 indicated by an arrow 811 is a rare earth segregation region 81 having a relatively large area. On the other hand, in the middle portion-evaluation region 212 shown in FIG. 8B, the rare earth segregation region 811 having relatively large area is observed more than that in the end portion evaluation region 211 shown in FIG. 8A, as shown by arrows 812 and 813. In other words, the relationship of the segregation amount of rare earth elements in the rare earth segregation region 81 present in the effective layer-middle portion 202 in the WI cross section in the middle in the length direction relative to the segregation amount of rare earth elements in the rare earth segregation region 81 present in the effective layer-width direction-end portion 201 in the WT cross section in the vicinity of the boundary between the L gap and the effective layer potion 14 is expressed as the effective layer-middle portion 202>the effective layer-width direction-end portion 201. In addition, the vicinity of the boundary between the L gap and the effective layer portion 14 indicates a portion in the vicinity of the end of the effective layer portion 14 adjacent to the first end surface 7 and a portion in the vicinity of the end of the effective layer portion 14 adjacent to the second end surface 8 in the LT cross section.

As described above, in the multilayer ceramic capacitor 1 of the present example embodiment, in the WT cross section, the relationship between the segregation amount of the rare earth element in the rare earth segregation region 81 in the effective layer-middle portion 202 and the segregation amount of the rare earth element in the rare earth segregation region 81 in the effective layer-width direction-end portion 201 is expressed as the effective layer-middle portion 202>the effective layer-width direction-end portion 201.

The above expression indicates that the segregation amount of the rare earth element in the rare earth segregation region 81 in the effective layer-width direction-end portion 201 is smaller than the segregation amount of the rare earth element in the rare earth segregation region 81 in the effective layer-middle portion 202. Since the rare earth segregation regions 81 in the effective layer-width direction-end portion 201 and the effective layer-middle portion 202 have the above-described relationship, it is possible to increase the reliability in the multilayer ceramic capacitor 1 according to the present example embodiment. Hereinafter, a description for this will be provided.

It is assumed that the atomic concentration of the rare earth element included in the effective layer-width direction-end portion 201 is equal to the atomic concentration of the rare earth element included in the effective layer-middle portion 202. In general, the reliability of the effective layer-width direction-end portion 201 tends to be lower than the reliability of the effective layer-middle portion 202. In the multilayer ceramic capacitor 1 of the present example embodiment, the segregation amount of the rare earth element in the effective layer-width direction-end portion 201 is smaller than the segregation amount of the rare earth element in the effective layer-middle portion 202. A small amount of segregation of the rare earth element indicates a large amount of the rare earth element in the form of solid solution in the dielectric layer 20. As described above, in the multilayer ceramic capacitor 1 of the present example embodiment, the amount of the rare earth element in the form of solid solution in the dielectric layer 20 in the effective layer-width direction-end portion 201 is large. Therefore, it is possible to improve the reliability of the effective layer-width direction-end portion 201.

Further, in the multilayer ceramic capacitor 1 of the present example embodiment, the segregation amount of the rare earth element in the effective layer-middle portion 202 is relatively large. That is, the segregation amount of the rare earth element in the form of solid solution in the dielectric layer 20 is relatively small. Therefore, it is possible to maintain the temperature characteristics of the multilayer ceramic capacitor 1.

As described above, according to the multilayer ceramic capacitor 1 of the present example embodiment, it is possible to improve the high-temperature reliability while maintaining the temperature characteristics.

Segregation Amount of Rare Earth Elements

Here, the ratio of the segregation amount of the rare earth element in the effective layer-middle portion 202 to the segregation amount of the rare earth element in the effective layer-width direction-end portion 201 is preferably about 2 times or more and about 4 times or less, for example. According to the above configuration, it is possible to improve the high-temperature reliability.

When this ratio is less than about 2 times, the advantageous effect of improving the high temperature reliability decreases.

On the other hand, when the ratio is more than about 4 times, the dielectric material becomes difficult to fire and the grain growth of the dielectric particles is suppressed. As a result, the permittivity of the dielectric layer 20 decreases, and the capacitance of the multilayer ceramic capacitor 1 decreases.

On the other hand, when the segregation amount of the rare earth element exceeds a predetermined value, the high-temperature reliability decreases conversely.

The ratio of the segregation amount of the rare earth element in the effective layer-middle portion 202 to that in the effective layer-width direction-end portion 201 is more preferably three times.

Aluminum Segregation Region

The multilayer ceramic capacitor 1 of the present example embodiment includes an aluminum segregation region 82 in the multilayer body 2. The aluminum segregation region 82 refers to a region in which aluminum is segregated in the multilayer body 2. Further, in the multilayer ceramic capacitor 1 of the present example embodiment, the aluminum segregation region 82 exists in the effective layer-width direction-end portion 201, but does not exist in the effective layer middle portion 202. A description will be made with reference to FIGS. 9A and 9B.

Figure 9A:
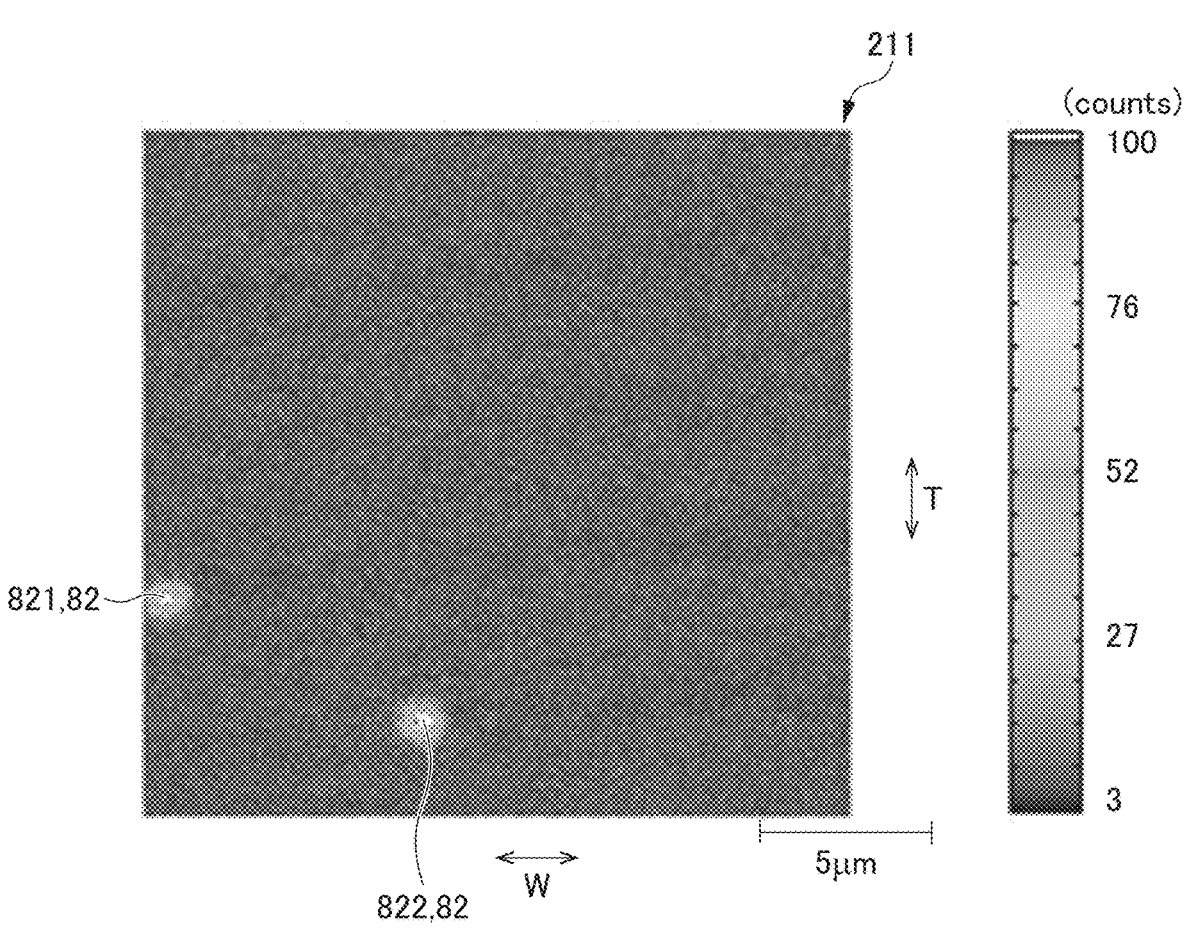
FIG. 9A is an FE-WDX image of an end portion-evaluation region and shows segregation of aluminum.
Figure 9B:
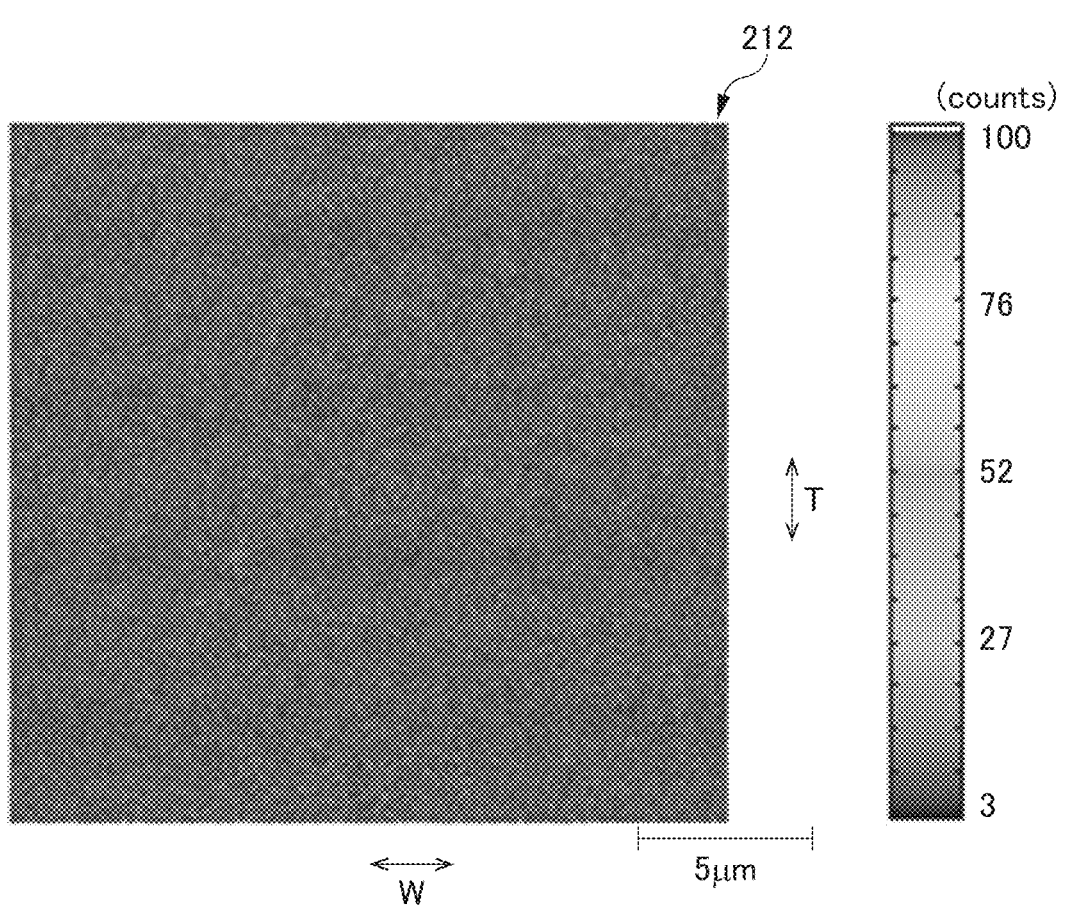
FIG. 9B is an FE-WDX image of a middle portion-evaluation region and shows segregation of aluminum.

FIG. 9A is an FE-WDX image of the end portion-evaluation region 211. FIG. 9B is an FE-WDX image of the middle portion-evaluation region 212. FIGS. 9A and 9B each show the segregation of aluminum. The image shown in FIG. 7A and the image shown in FIG. 9A are images at the same position in the WT cross section. Similarly, the image shown in FIG. 7B and the image shown in FIG. 9B are images at the same position in the WT cross section. The white portions in FIG. 9A each indicate the aluminum segregation region 82.

The end portion-evaluation region 211 includes a plurality of aluminum segregation regions 82 as indicated by the arrows 821 and 822 in FIG. 9A. On the other hand, in the middle portion-evaluation region 212, there is no aluminum segregation region 82 as shown in FIG. 9B.

The effective layer-width direction-end portion 201 is a portion where the dielectric layers 20 tend to be thin and the high temperature reliability tends to be lowered. In the multilayer ceramic capacitor 1 of the present example embodiment, aluminum is selectively segregated in the effective layer-width direction-end portion 201. Therefore, the high-temperature reliability of the multilayer ceramic capacitor 1 is improved.

Internal Electrode Existence Region and Internal Electrode Separation Region

In the multilayer ceramic capacitor 1 of the present example embodiment, as shown in FIGS. 7A and 7B, each of the internal electrode layers 30 includes at least one internal electrode existence region 311 and at least one internal electrode separation region 312. The aluminum segregation region 82 exists in the internal electrode separation region 312 in the end portion-evaluation region 211.

The internal electrode existence region 311 refers to a region in which the internal electrode layer 30 continuously exists in the width direction W in the WT cross section. The internal electrode separation region 312 refers to a region in which the internal electrode layer 30 is divided in the width direction W in the WT cross section. No material of the internal electrode layer 30 exists in the internal electrode separation region 312. In the internal electrode separation region 312, the material of the internal electrode layer 30 is missing.

In the multilayer ceramic capacitor 1 of the present example embodiment, the aluminum segregation region 82 exists in the internal electrode separation region 312 in the end portion-evaluation region 211. With the above structure, it is possible to further obtain an advantageous effect of improving the high-temperature reliability.

In the multilayer ceramic capacitor 1 of the present example embodiment, aluminum segregates in a portion where the internal electrode layer 30 is missing in the effective layer-width direction-end portion 201. That is, the portion in which the internal electrode layer 30 is missing is filled with the aluminum segregation region 82. Therefore, it is possible to reduce or prevent the concentration of the electric field to a portion where the internal electrode layer 30 in which the electric field is originally likely to concentrate is missing. As a result, it is possible to improve the reliability of the multilayer ceramic capacitor 1. Aluminum is usually segregated in the form of aluminum oxide.

Definition of Rare Earth Segregation Amount and Measurement Method

The amount of rare earth segregation can be defined by cps (Count per second) which is the number of X-ray photons per unit time according to the WDX. Specifically, from the element mapping of the FE-WDX, the number of cells whose rare earth element count is about 20 cps or more is defined as the rare earth element segregation amount, for example.

An example of a specific measuring method is as follows.

The peripheral portion of the measurement sample is impregnated with an epoxy resin and cured.

The measurement sample including the epoxy resin is polished in a direction in which a cross s section parallel or substantially parallel to the width direction W and the height direction T is observable.

Only the first end surface-side outer layer portion 17 or the second end surface-side outer layer portion 18, that is, only the L gap, is mirror polished. The cross section of the end of the effective layer portion 14 in the length direction L is thereby exposed. The cross-sectional view taken along the line 106-106 of FIG. 2, i.e., FIG. 6A, shows such a cross section.

Mirror-polishing is further advanced, and the mirror-polishing is performed on the middle position in the length direction L of the multilayer ceramic capacitor 1. The cross section in the middle portion of the effective layer portion 14 in the length direction L is thereby exposed. The cross-sectional view taken along the line 105-105 of FIG. 2, i.e., FIG. 6B, shows such a cross section.

Gold coating is applied to the exposed surface of each cross section under conditions of 30 mA and 60 seconds.

Element mapping is performed using FE-WDX (device name: EPMA-8050G (product name)).

The observed location of the element mapping is defined as the end portion-evaluation region 211 of the effective layer-width direction-end portion 201 in the cross section of the effective layer portion in the length direction L in which only the L gap is polished. On the other hand, in the cross section polished to the middle position in the length direction L of the multilayer ceramic capacitor 1 in the length direction L, the observation portion of the element mapping is defined as the middle portion-evaluation region 212 of the effective layer-middle portion 202.

The observation conditions are a magnification of 3300 times, an acceleration voltage of 15 kV, an image size of 240×240 pix, an integration time of 45 ms/pix, and a beam current of 50 nA, and the count number (unit: cps) of elements for each cell is converted into numerical values for each rare earth element. At this time, a cell of about 20 cps or more is defined as segregation, and the number of the cells is counted in each of the end portion-evaluation region 211 and the middle portion-evaluation region 212. A region defined as segregation here is defined as a segregation region. The count number in the end portion-evaluation region 211 is defined as Pw. The count number in the middle portion-evaluation region 212 is defined as Pc. The field of view of the measurement is 20 μm×20 μm.

Segregation of aluminum is similarly evaluated.

Material of Measurement Sample

The dielectric material is a ceramic material having a perovskite structure including barium, strontium, zirconium, titanium, hafnium, or calcium. Silicon and dysprosium as a rare earth element are further added to the ceramic material.

EXAMPLES AND COMPARATIVE EXAMPLES

Examples and Comparative Examples will be described with reference to FIG. 10. FIG. 10 is a table showing evaluation results for the Examples and Comparative Examples. In FIG. 10, the count Pw in the end portion-evaluation region 211 is expressed as a ratio when the count number Pc in the middle portion-evaluation region 212 is "1" (provided that Comparative Example 1 in which no segregation region is observed is excluded).

Samples were manufactured by lot unit according to the manufacturing method described below, with manufacturing conditions adjusted for different segregation amounts, as Examples 1-22 and Comparative Examples 1-3. The samples in each lot were manufactured with the same manufacturing conditions. For each Example and Comparative Example, n samples (n=3) for measuring segregation amounts, n samples (n=5) for evaluating temperature characteristics, and n samples (n=40) for evaluating high-temperature load reliability were taken and prepared from the same lot. For measuring the segregation amount and evaluating the temperature characteristic, the average values of the measurement result and the evaluation result were used.

Temperature Characteristics

At each stage of −55° C., 25° C. and 125° C., the capacitance at the time when the temperature reached a predetermined temperature and 5 minutes passed was measured. When the capacitance value at the reference temperature T1 of 25° C. is defined as C1 and the capacitance value at each measurement temperature T2 is defined as C2, the temperature coefficient α was calculated by the following equation.

$$\alpha = (C2 - C1) / \{C1(T2 - T1)\} \times 10^6$$

Samples in which the temperature coefficient α fall within 0±30 ppm/° C. were evaluated to be "○ (circle symbol)", and samples in which the temperature coefficient α fall within 0±60 ppm/° C. outside the range of 0±30 ppm/° C. were evaluated to be "Δ (triangle symbol)". In addition, five samples of each of Examples and Comparative Examples were subjected to measurement and evaluation, and an average value thereof was used for evaluation.

High Temperature Load Test

Each sample was subjected to a high temperature load test based on the HALT test method. More specifically, each of the samples was individually set in a dedicated jig, and the sample was placed in a high-temperature tank at a temperature of 150° C., and a direct current of 120% of the rated voltage was applied between the pair of external electrodes, and the state was maintained for 100 hours. Then, those which did not fail during the test were evaluated as "⊙ (bullseye symbol)", those which failed one to three during the test were evaluated as "○ (circle symbol)", and those which failed four or more during the test were evaluated as "x (cross symbol)". Each of the 40 samples of Examples and Comparative Examples was subjected to measurement and evaluation. As shown in Comparative Examples 1 and 2, when the segregation amount of the rare-earth element in the rare-earth segregation region did not satisfy the relationship of the effective layer-middle portion>the effective layer-width direction-end portion, high-temperature load reliability was not obtained. In Comparative Example 1, no rare earth element was added.

Further, as shown in Examples 8 to 10, when the aluminum segregation region existed in the effective layer-width direction-end portion, the high temperature load reliability was further improved. In Examples 4 and 5, the ratio of the segregation amount of the rare earth element in the effective layer-middle portion to the effective layer-width direction-end portion exceeded five times. Therefore, it is presumed that the solid solution of the rare earth element was accelerated in the effective layer-width direction-end portion, and the temperature characteristics were degraded. The ratio of the amount of segregation of rare earth elements in the effective layer-middle portion to the effective layer-width direction-end portion is preferably 2 times or more and 5 times or less, more preferably about 2 times or more and about 4 times or less, for example.

Method of Manufacturing Multilayer Ceramic Capacitor

An example of a method of manufacturing the multilayer ceramic capacitor will be described. The method of manufacturing the multilayer ceramic capacitor is not limited to the following method.

A dielectric sheet for manufacturing the dielectric layer 20 and an electrically conductive paste for manufacturing the internal electrode layer 30 are prepared. Both the dielectric sheet for manufacturing the dielectric layer 20 and the electrically conductive paste for manufacturing the internal electrode layer 30 include a binder and a solvent. The binder and the solvent may be known. Examples of a paste made of an electrically conductive material include a paste obtained by adding an organic binder and an organic solvent to a metal powder.

An electrically conductive paste for manufacturing the internal electrode layer 30 is printed on the dielectric sheet using a printing plate designed to have the shape of the internal electrode layer 30. Examples of printing methods include screen printing and gravure printing. Thus, a dielectric sheet having a pattern of the first internal electrode layer 31 and a dielectric sheet having a pattern of the second internal electrode layer 32 are prepared.

By laminating a predetermined number of dielectric sheets on which patterns of the internal electrode layers 30 are not printed, a portion to be the first main surface-side outer layer portion 12 adjacent to the first main surface 3 is formed. The dielectric sheet on which the pattern of the first internal electrode layer 31 is printed and the dielectric sheet on which the pattern of the second internal electrode layer 32 is printed are sequentially and alternately laminated thereon to form a portion to be the inner layer portion 10. A predetermined number of dielectric sheets on which patterns of the internal electrode layers 30 are not printed are laminated on the portion functioning as the inner layer portion 10 to form a portion functioning as the second main surface-side outer layer portion 13 adjacent to the second main surface 4. Thereby, a multilayer sheet is obtained.

In a case where, in preparing a dielectric sheet, $ABO_3$ is used as a dielectric material having a perovskite structure as a main component (A represents an element at the A site in the perovskite structure, and B represents an element at the B site in the perovskite structure), when the element of the B site is 100 mol %, the rare earth element is prepared to be about 0.5 mol % or more and about 2.5 mol % or less, for example. The rare earth element is dysprosium. Thus, it comes to facilitate establishing the relationship between the segregation amount of the rare earth element in the rare earth segregation region 81 in the effective layer-width direction-end portion 201 and the segregation amount of the rare earth element in the rare earth segregation region 81 in the effective layer-middle portion 202 to be: the effective layer-middle portion>the effective layer-width direction-end portion.

When preparing the dielectric sheet, aluminum oxide of about 0.02 mol % or more and about 1.0 mol % or less, for example, is added to the dielectric material. This facilitates the presence of the aluminum segregation region in the effective layer-width direction-end portion.

Next, the multilayer sheet is pressed in the height direction via a hydrostatic press or the like to prepare a multilayer block.

Next, the multilayer block is cut into a predetermined size and divided into a plurality of multilayer chips. Thereafter, each of the multilayer chips may be polished by barrel polishing or the like to round the corner portions and the ridge portions.

Next, the multilayer chip is fired. The multilayer body is manufactured by this firing. The firing temperature is preferably about 900° C. or more and about 1400° C. or less, for example. The firing temperature can be varied depending on the materials of the dielectric and internal electrode layers.

Here, the amount of gas is adjusted while maintaining the highest temperature in the firing step, and the oxygen partial pressure at the end of maintaining the highest temperature is made higher than the oxygen partial pressure at the start of maintaining the highest temperature. Thus, it comes to facilitate establishing the relationship between the segregation amount of the rare earth element in the rare earth segregation region 81 in the effective layer-width direction-end portion 201 and the segregation amount of the rare earth element in the rare earth segregation region 81 in the effective layer-middle portion 202 to be: the effective layer-middle portion>the effective layer-width direction-end portion. Further, the aluminum segregation region can be easily present in the effective layer-width direction-end portion.

An electrically conductive paste functioning as the base electrode layer 50 is applied to both end surfaces of the multilayer body 2. In the present example embodiment, the base electrode layer 50 is a fired layer. The fired layer can be formed by applying an electrically conductive paste including a glass component and a metal to the multilayer body 2 by a method such as dipping, and then performing firing treatment. The temperature of the firing treatment at this time is preferably about 700° C. or more and about 900° C. or less, for example.

The multilayer chip before firing and the electrically conductive paste applied to the multilayer chip may be fired simultaneously. In this case, the fired layer is preferably formed by firing a ceramic material added instead of the glass component. At this time, as the ceramic material to be added, it is preferable to use the same kind of ceramic material as that of the dielectric layer 20. In this case, an electrically conductive paste is applied to the multilayer chip before firing, and the multilayer chip and the electrically conductive paste applied to the multilayer chip are fired at the same time to form the multilayer body 2 in which the fired layer is formed.

Then, a plated layer is formed on the surface of the base electrode layer 50 made of the fired layer. In the present example embodiment, the first plated layer 71 is formed on the surface of the first base electrode layer 51. A second plated layer 72 is formed on the surface of the second base electrode layer 52. In the present example embodiment, a nickel plated layer and a tin plated layer are formed as the plated layers. In the plating treatment, either electrolytic plating or electroless plating may be adopted. However, the electroless plating requires a pretreatment using a catalyst or the like in order to improve the plating precipitation rate, and therefore, there is a disadvantage that the process becomes complicated. Therefore, it is usually preferable to use electrolytic plating. The nickel plated layer and the tin plated layer are sequentially formed by, for example, barrel plating.

When the electrically conductive resin layer is provided, the electrically conductive resin layer may cover the fired layer. When the electrically conductive resin layer is provided, an electrically conductive resin paste including a thermosetting resin and a metal component is applied on the fired layer, and then heat-treated at a temperature from about 250° C. to about 550° C. or more, for example. Thus, the thermosetting resin is thermally cured to form the electrically conductive resin layer. The atmosphere during the heat treatment is preferably an $N_2$ atmosphere. In order to prevent scattering of the resin and to prevent oxidation of various metal components, the oxygen concentration is preferably about 100 ppm or less, for example.

The multilayer ceramic capacitor 1 is manufactured by the manufacturing process described above.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of laminated dielectric layers and a plurality of laminated internal electrode layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, an effective layer portion including the plurality of dielectric layers and the plurality of internal electrode layers that are alternately laminated, and outer layer portions that sandwich the effective layer portion in the height direction;
   a first external electrode on the first end surface; and
   a second external electrode on the second end surface; wherein
   the multilayer body includes an effective layer-width direction-end portion provided at an end portion of the effective layer portion in the width direction and an effective layer-middle portion provided at a middle portion of the effective layer portion;
   the multilayer body further includes a rare earth segregation region in which a rare earth element is segregated;
   in a cross section parallel or substantially parallel to the width direction and the height direction, a relationship between a segregation amount of the rare earth element in the rare earth segregation region in the effective layer-width direction-end portion and a segregation amount of the rare earth element in the rare earth segregation region in the effective layer-middle portion is expressed as: the effective layer-middle portion>the effective layer-width direction-end portion; and a dielectric material of the plurality of dielectric layers includes at least one of calcium, zirconium, or strontium, and includes a perovskite structure.

2. The multilayer ceramic capacitor according to claim 1, wherein a ratio of the segregation amount of the rare earth element in the effective layer-middle portion to the segregation amount of the rare earth element in the effective layer-width direction-end portion is about 2 times or more and about 4 times or less.

3. The multilayer ceramic capacitor according to claim 1, wherein the multilayer body further includes an aluminum segregation region in which aluminum is segregated; and the aluminum segregation region exists in the effective layer-width direction-end portion, and does not exist in the effective layer-middle portion.

4. The multilayer ceramic capacitor according to claim 3, wherein the plurality of internal electrode layers each include an internal electrode existence region and an internal electrode separation region; and the aluminum segregation region exists in the internal electrode separation region.

5. The multilayer ceramic capacitor according to claim 1, wherein an A site of the perovskite structure includes at least one calcium or strontium and a B site of the perovskite structure includes at least one of zirconium, titanium, or hafnium.

6. The multilayer ceramic capacitor according to claim 1, wherein the dielectric material of the plurality of dielectric layers includes barium titanate, calcium titanate, strontium titanate, titanium oxide, or calcium zirconate.

7. The multilayer ceramic capacitor according to claim 1, wherein a thickness of each of the plurality of dielectric layers is about 0.2 μm or more and about 10 μm or less.

8. The multilayer ceramic capacitor according to claim 1, wherein each of the plurality of internal electrode layers includes nickel, copper, silver, palladium, or gold, or an alloy including at least one of nickel, copper, silver, palladium, or gold.

9. The multilayer ceramic capacitor according to claim 1, wherein a thickness of each of the plurality of internal electrodes is about 0.2 μm or more and about 2.0 μm or less.

10. The multilayer ceramic capacitor according to claim 1, wherein each of the first external electrode and the second external electrode includes a base electrode layers and a plated layer.

11. The multilayer ceramic capacitor according to claim 1, wherein each of the first external electrode and the second external electrode includes an electrically conductive resin layer.

12. The multilayer ceramic capacitor according to claim 1, wherein the multilayer ceramic capacitor has a dimension in the length direction of about 0.2 mm or more and about 6 mm or less, a dimension in the height direction of about 0.05 mm or more and about 5 mm or less, and a dimension in the width direction of about 0.1 mm or more and about 5 mm or less.

13. The multilayer ceramic capacitor according to claim 1, wherein the segregation amount of the rare earth element in the multilayer body is not uniform.

14. The multilayer ceramic capacitor according to claim 1, wherein the effective layer-width direction-end portion is about 20 μm from each end of the effective layer portion in the width direction toward an inside of the effective layer portion.

15. The multilayer ceramic capacitor according to claim 1, wherein the effective layer-middle portion has a width of about 20 μm in the middle portion of the effective layer portion in the width direction.

16. The multilayer ceramic capacitor according to claim 1, wherein the aluminum is segregated in the form of aluminum oxide.

\* \* \* \* \*